(12) United States Patent
Kawakami

(10) Patent No.: US 9,731,390 B2
(45) Date of Patent: Aug. 15, 2017

(54) OBJECT POSITIONING/FIXING DEVICE

(71) Applicant: PASCAL ENGINEERING CORPORATION, Hyogo (JP)

(72) Inventor: Takayuki Kawakami, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 0 days.

(21) Appl. No.: 14/410,358

(22) PCT Filed: Apr. 30, 2013

(86) PCT No.: PCT/JP2013/062546
§ 371 (c)(1),
(2) Date: Dec. 22, 2014

(87) PCT Pub. No.: WO2014/006966
PCT Pub. Date: Jan. 9, 2014

(65) Prior Publication Data
US 2015/0321302 A1    Nov. 12, 2015

(30) Foreign Application Priority Data
Jul. 4, 2012 (JP) ................................. 2012-150320

(51) Int. Cl.
*B23Q 3/00*    (2006.01)
*B23Q 1/00*    (2006.01)
*B23Q 3/18*    (2006.01)

(52) U.S. Cl.
CPC ............. *B23Q 1/0063* (2013.01); *B23Q 3/18* (2013.01)

(58) Field of Classification Search
CPC ................................. B23Q 1/0063; B23Q 3/18
(Continued)

(56) References Cited

U.S. PATENT DOCUMENTS 6,955,347 B2 * 10/2005 Kawakami ............... B23Q 3/18
                                                            269/309
8,505,896 B2 *  8/2013 Kitaura ................... B23Q 3/183
                                                            269/309

(Continued)

FOREIGN PATENT DOCUMENTS

| DE | 19826328 C1 | 11/1999 |
|---|---|---|
| JP | 2005-96012 | 4/2005 |
| JP | 2011-251376 | 12/2011 |

*Primary Examiner* — Monica Carter
*Assistant Examiner* — Nirvana Deonauth
(74) *Attorney, Agent, or Firm* — Norris McLaughlin & Marcus, P.A.

(57) ABSTRACT

In an object positioning/fixing device that positions and fixes a target object on a base member in the horizontal direction and in the vertical direction, a structure is provided in which, in a state in which the target object is pressed against the base member and fixed thereon by a fixation mechanism: first and second tapered engagement surfaces of first and second reference members are closely contacted against the inner circumferential surfaces of first and second annular engagement members via elastic deformation of the first and second annular engagement members; also first and second base end contact surfaces of the first and second reference members are contacted against the base member; and a pair of regulated surfaces of the second annular engagement member are closely contacted against a pair of regulating surfaces of a second installation hole via elastic deformation of the second annular engagement member.

6 Claims, 16 Drawing Sheets

(58) Field of Classification Search
USPC .......................................... 269/56, 309, 310
See application file for complete search history.

(56) References Cited

U.S. PATENT DOCUMENTS

2012/0321410 A1* 12/2012 Kitaura .................... B23Q 3/18
411/55
2013/0043634 A1 2/2013 Kitaura et al.

* cited by examiner

OBJECT POSITIONING/FIXING DEVICE

TECHNICAL FIELD

The present invention relates to an object positioning/fixing device that positions and fixes a target object on a base member in the horizontal direction and in the vertical direction, and in particular relates to such a device that is capable of permitting deviation between the axes of two positioning mechanisms that are for regulating positioning and rotation in the horizontal direction.

BACKGROUND OF THE INVENTION

From the past, work pallets (target objects) of various types for fixing a workpiece to be supplied to machining process, and work pallet positioning/fixing devices that position and fix such a work pallet on a base member, have been widely employed in practice.

For example, in the object positioning/fixing device described in Patent Document #1, a reference seating surface for positioning in the vertical direction is formed on the upper surface of a base member, and first and second reference members for positioning in the horizontal direction are provided at locations near a pair of corner portions of the base member which are in a diagonal relationship. Each of the first and second reference members comprises a flange portion that is contained in a fitting aperture in the base member and is fixed therein by a plurality of bolts, a convex engagement portion that projects upward from the central portion of this flange portion, a tapered engagement surface that is formed on the outer circumferential surface of this convex engagement portion, and a bolt hole that is formed in this convex engagement portion.

It should be understood that, while the tapered engagement surface of the first reference member is formed over the entire circumference of the outer surface portion of its convex engagement portion, the tapered engagement surface of the second reference member is formed at two locations on the outer surface portion of its convex engagement portion that oppose one another in the direction orthogonal to the line of centers that connects the axis of the first reference member and the axis of the second reference member, and a pair of shallow circular arcuate grooves are formed at the outer surface portions between this pair of tapered engagement surfaces.

Fitting apertures that are concave downward, bolt passage holes that connect to these fitting apertures, and head portion reception holes at the upper portions of these bolt passage holes for containing bolt head portions, are formed on the work pallet at positions that correspond to the first and second reference members. And first and second annular engagement members that can engage in a closely contacting state with the convex engagement portions of the first and second reference members respectively are fixed in the abovementioned fitting apertures.

With this object positioning/fixing device, by mounting the work pallet on the base member, and by passing bolts from above through the pair of bolt passage holes and screwingly engaging them into the bolt holes of the first and second reference members, it is arranged to position the pair of portions of the work pallet that neighbor its pair of corner portions on the base member in the vertical direction and in the horizontal direction and to fix them there, in the state in which the lower surface of the work pallet is seated on the reference seating surface.

Furthermore, by forming bolt holes at the other pair of corner portions of the base member that are in a diagonal relationship than the abovementioned pair of corner portions, by forming a pair of bolt passage holes in the work pallet corresponding to the pair of bolt holes, and by passing a pair of bolts from above through the pair of bolt passage holes and screwingly engaging them into corresponding bolt holes, the portions of the work pallet neighboring the other pair of corner portions are fixed to the base member.

Patent Document #1: Japanese Laid Open Pat. Publication 2011-251376

SUMMARY OF THE INVENTION

Now in Patent Document #1, if the distance between the axes of the first and second reference members and the distance between the axes of the first and second annular engagement members are not equal to one another, since, as shown in FIG. 33, the second reference member 101 is provided with the pair of opposing shallow circular arcuate grooves 101b along the direction parallel to the line of centers L, accordingly positional deviation of the second annular engagement member 110 in the direction of the line of centers L is permitted, so that the second annular engagement member 110 comes to be engaged in a state in which it has deviated with respect to the second reference member 101 (refer to the double dotted broken line in FIG. 33).

However, when the work pallet is positioned and fixed on the base member 100 in the state in which the inter-axis distances described above are not equal to one another, the inner circumferential surface of the second annular engagement member 110 is not engaged with the pair of tapered engagement surfaces 101a of the second reference member 101 in a surface contacting state, but only portions of these surfaces are contacted in a local contacting state, which is undesirable. If fitting and removal of the work pallet are repeatedly performed in this state, there are the problems that the tapered engagement surface 101a of the second reference member 101 may suffer wear and tear and be damaged, that the positioning accuracy in the horizontal direction may be deteriorated, and that the accuracy of processing of the workpiece may become worse.

Furthermore, with the object positioning/fixing device of Patent Document #1, if there is some variation in the position in the vertical direction of the pair of convex engagement portions with respect to the reference seating surface of the base member due to manufacturing error, then it is not possible to obtain the anticipated function for positioning in the horizontal direction. However, when fitting apertures are formed for fitting the flange members of the first and second reference members, it is not possible to set the height positions of the convex engagement portions of the first and second reference members, in other words the height positions of their tapered engagement surfaces, at high accuracy with respect to the reference seating surface of the base member, since it is extremely difficult to keep the machining process tolerance related to the depths of the fitting apertures within around 5 μm. Due to this, there is the problem that it is difficult to ensure positioning accuracy for positioning the work pallet in the horizontal direction with respect to the reference seating surface of the base member.

Yet further, with the object positioning/fixing device of Patent Document #1, since flange portions are provided in this construction on the first and second reference members, and the flange portions are fixed in the fitting holes by a plurality of bolts, accordingly the first and second reference members become large sized members that are complicated in structure, and there is the problem that their manufacturing costs (the cost of the material, the cost of machining, and the cost of fitting) become high, and so on.

The objects of the present invention are: to provide an object positioning/fixing device that, along with improving the accuracy for positioning the work pallet in the horizontal direction, is capable of absorbing deviation between the distance between the axes of the first and second reference members and the distance between the axes of the first and second annular engagement members; to provide an object positioning/fixing device that is capable of simplifying the construction of the first and second reference members and of making them more compact, and is also capable of reducing the manufacturing cost; and so on.

The object positioning/fixing device of the present invention is an object positioning/fixing device that positions and fixes a target object on a base member in a horizontal direction and in a vertical direction, characterized in that: the base member comprises a reference seating surface for positioning in the vertical direction, and the target object comprises a contact surface that can be contacted against the reference seating surface; there are provided with a first positioning mechanism that can position the target object in the horizontal direction; a second positioning mechanism that is disposed at a position removed from the first positioning mechanism and that performs regulation so that the target object does not rotate within a horizontal plane around the first positioning mechanism as a center; and a fixation mechanism that can press and fix the target object to the base member; the first and second positioning mechanisms comprise: first and second reference members that are installed to one of the base member and the target object, and that comprise first and second convex engagement portions on which first and second tapered engagement surfaces are formed whose diameters become smaller towards their ends, first and second fitting barrel portions that are formed integrally with these first and second convex engagement portions and whose diameters are smaller than those of the first and second convex engagement portions, and first and second base end contact surfaces that are formed at their base ends toward the first and second fitting barrel portions of the first and second convex engagement portions; first and second fitting holes into which the first and second fitting barrel portions are fitted; and first and second annular engagement members that are installed in first and second installation holes formed in the other of the base member and the target object, and with which the first and second convex engagement portions can be engaged; the second installation hole comprises a pair of regulating surfaces that are formed so that the second annular engagement member is shiftable along the direction of the line of centers that connects the axes of the first and second positioning mechanisms, and that are parallel to the direction of the line of centers; the second annular engagement member comprises a pair of regulated surfaces that can be closely contacted against the pair of regulating surfaces; and, in the state in which the target object is pressed and fixed against the base member by the fixation mechanism: via elastic deformation in the radial direction of at least one of the first and second convex engagement portions and the first and second annular engagement members, the first and second tapered engagement surfaces are closely contacted against the inner circumferential surfaces of the first and second annular engagement members; the first and second base end contact surfaces are contacted against one of the base member and the target object; the annular end surfaces of the first and second annular engagement members are contacted against the annular reception surfaces of the first and second installation holes; and, via elastic deformation of the second annular engagement member, the pair of regulated surfaces are closely contacted against the pair of regulating surfaces.

In the other aspect of the object positioning/fixing device, the second installation hole may be directly formed in the other one of the base member and the target object.

In the other aspect of the object positioning/fixing device, a slit may be formed in the second annular engagement member for promoting elastic deformation thereof in the radial direction.

In the other aspect of the object positioning/fixing device, the second installation hole may be formed in a bush member that is installed into and fitted in a cylindrical hole formed in the other one of the base member and the target object.

In the other aspect of the object positioning/fixing device, the second annular engagement member may comprise a main annular portion to which the second convex engagement portion engages, and a small diameter annular portion that is formed integrally therewith so as to extend from an end portion opposite to one end of the main annular portion away from that one end, and whose diameter is smaller than that of the main annular portion; the second installation hole may comprise a main installation hole portion in which the main annular portion is contained so as to be shiftable in the horizontal direction, and a small diameter installation hole portion that communicates with the main installation hole portion and in which the small diameter annular portion is contained so as to be shiftable in the direction of the line of centers; the pair of regulating surfaces may be formed to be a pair of tapered regulating surfaces that are formed on an internal circumferential portion of the small diameter installation hole portion and that slope so as to approach one another away from the second convex engagement portion; and the pair of regulated surfaces are formed on the small diameter annular portion so as to be capable of closely contacting the pair of tapered regulating surfaces.

In the other aspect of the object positioning/fixing device, the fixation mechanism may comprise first bolt passage holes formed in each of the first and second reference members, second bolt passage holes formed in the target object so as to correspond to each of these first bolt passage holes, and first bolt holes formed in the base member so as to correspond to each of the first and second bolt passage holes.

According to the present invention, when the target object is to be positioned and fixed to the base member, and when the target object is pressed toward the base member by the fixation mechanism, along with the first and second tapered engagement surfaces being closely contacted to the inner circumferential surfaces of the first and second annular engagement members via elastic deformation in the radial direction of at least one of the first and second convex engagement portions and the first and second annular engagement members, also the first and second base end contact surfaces are contacted against one of the base member and the target object, the annular end surfaces of the first and second annular engagement members are contacted against the annular reception surfaces of the first and second installation holes, and the pair of regulated surfaces are closely contacted against the pair of regulating surfaces via elastic deformation of the second annular engagement member.

Accordingly, even if there is some deviation between the distance between the axes of the first and second reference members and the distance between the axes of the first and second annular engagement members, still it is possible to absorb the positional deviation (i.e. the pitch tolerance) of the second annular engagement member with respect to the second reference member, since, when the second annular engagement member is engaged to the second reference member, the second annular engagement member is only fixed after having automatically shifted in the direction parallel to the line of centers. For this reason, even if the distance between the axes of the first and second annular engagement members is not set at high accuracy, still it is possible to position and fix the target object on the base member in a state in which the inner circumferential surface of the second annular engagement member is reliably closely contacted against the second tapered engagement surface of the second reference member, so that it is possible to improve the positioning accuracy for the target object in the horizontal direction and the accuracy by which its rotation is regulated within the horizontal plane.

Furthermore, since it is arranged for the second annular engagement member to be shiftable along the direction parallel to the line of centers, accordingly it is possible to form the second tapered engagement surface of the second reference member as an annulus, and, since it is possible reliably to engage it with the inner circumferential surface of the second annular engagement member in a closely contacting state, accordingly it is possible to prevent the second engagement surface from suffering wear and tear and being damaged, so that it is possible to improve the durability of the second positioning mechanism.

Yet further, since the first and second base end contact surfaces of the first and second convex engagement portions are contacted against the reference seating surface or against the contact surface, accordingly it is possible to improve the positioning accuracy for positioning the target object in the horizontal direction with respect to the base member, because it is possible to improve the accuracy of the positioning in the height direction of the first and second convex engagement portions with respect to the reference seating surface or the contact surface. Moreover, since it is arranged to fit and fix the first and second fitting barrel portions of the first and second reference members into the first and second fitting holes, and since the first and second fitting barrel portions are elements having smaller external diameters than the first and second convex engagement portions, accordingly it is possible to make the construction of the first and second reference members simpler and more compact, and it is possible greatly to reduce their cost of production (i.e. the cost of material, the machining process cost, and the assembly cost).

In the case where the second installation hole is directly formed in the other one of the base member and the target object, it is possible to provide a structure that is capable of absorbing pitch tolerance between the first and second annular engagement members by performing additional processing upon an already existing installation hole for fitting and fixing the second annular engagement member.

In the case where a slit is formed in the second annular engagement member for promoting elastic deformation thereof in the radial direction, it is possible to promote elastic deformation of the second annular engagement member via the slit that is formed in the second annular engagement member.

In the case where the second installation hole is formed in a bush member that is installed into and fitted in a cylindrical hole formed in the other one of the base member and the target object, the manufacture of the second installation hole is simple and easy.

In the case where the second annular engagement member is provided with the main annular portion and the small diameter annular portion whose diameter is smaller than that of this main annular portion, the second installation hole is provided with the main installation hole portion in which the main annular portion is contained and the small diameter installation hole portion in which the small diameter annular portion is contained, the pair of regulating surfaces consist of the pair of tapered regulating surfaces that are formed on the internal circumferential portion of the small diameter installation hole portion and that slope so as to approach one another away from the second convex engagement portion, and the pair of regulated surfaces are formed on the small diameter annular portion so as to be capable of closely contacting the pair of tapered regulating surfaces, it is possible to provide a structure that is capable of absorbing pitch tolerance between the first and second annular engagement members by performing additional processing upon an already existing installation hole for fitting and fixing the second annular engagement member.

In the case where the fixation mechanism comprises first bolt passage holes formed in each of the first and second reference members, second bolt passage holes formed in the target object so as to correspond to each of these first bolt passage holes, and first bolt holes formed in the base member so as to correspond to each of the first and second bolt passage holes, this is advantageous from the point of view of ensuring accuracy of positioning in the horizontal direction by the first and second reference members, due to the fact that there is no fear that the first and second fitting barrel portions of the first and second reference members will shift with respect to the first and second fitting holes, because the engagement force of the bolts does not act directly on the first and second reference members.

BEST MODE FOR IMPLEMENTING THE INVENTION

In the following, several modes for implementing the present invention will be explained on the basis of embodiments.

It should be understood that, in the following embodiments, positioning in the horizontal direction means determination of the position in the horizontal direction, while positioning in the vertical direction means determination of the position in the vertical direction.

Embodiment 1

Figure 1:
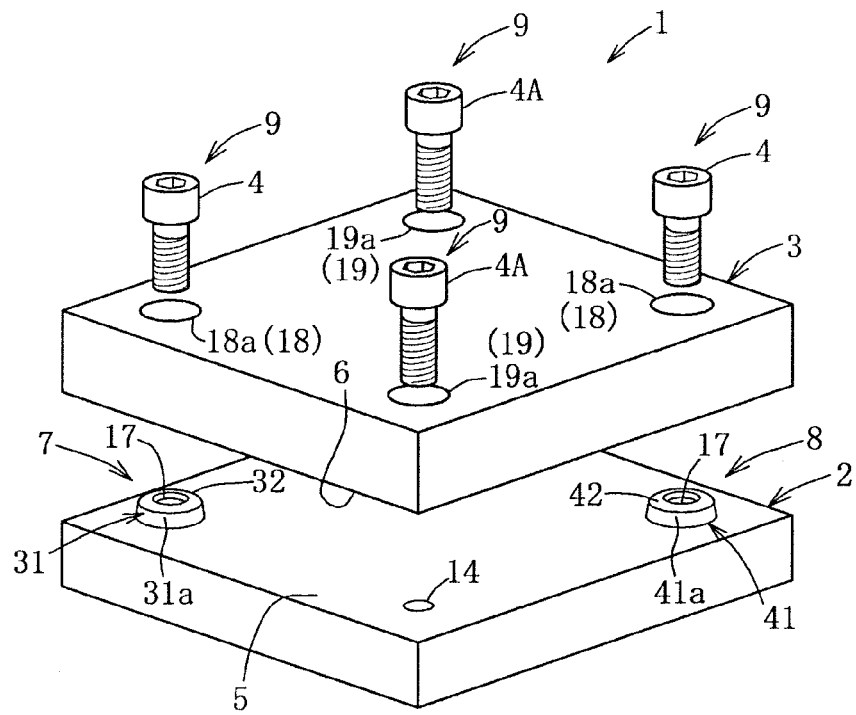
FIG. 1 is an exploded perspective view of a pallet positioning/fixing device according to a first embodiment.
Figure 2:
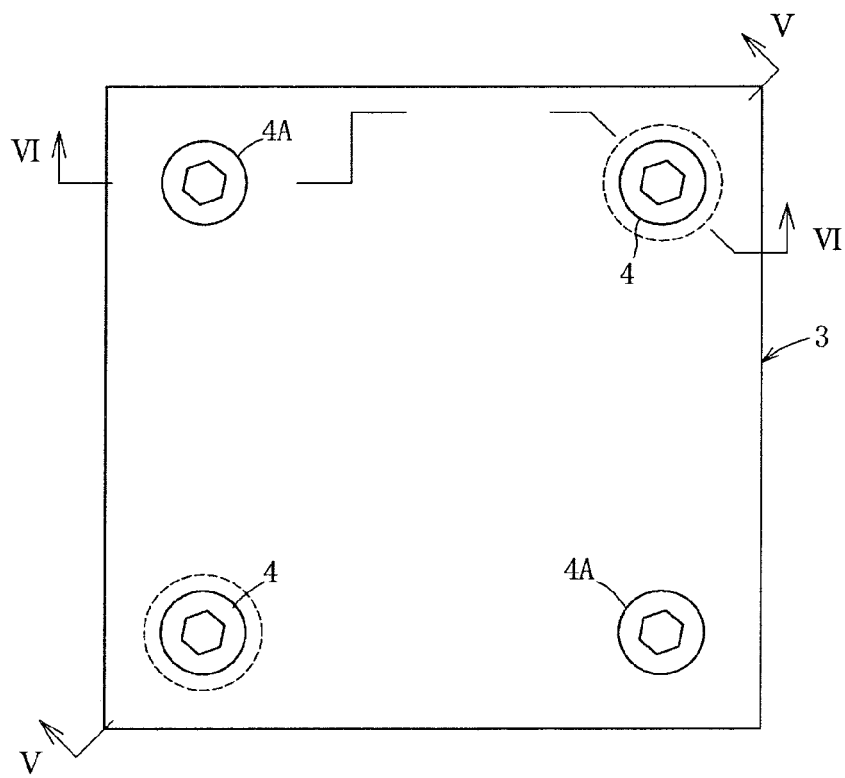
FIG. 2 is a plan view of the pallet positioning/fixing device.
Figure 3:
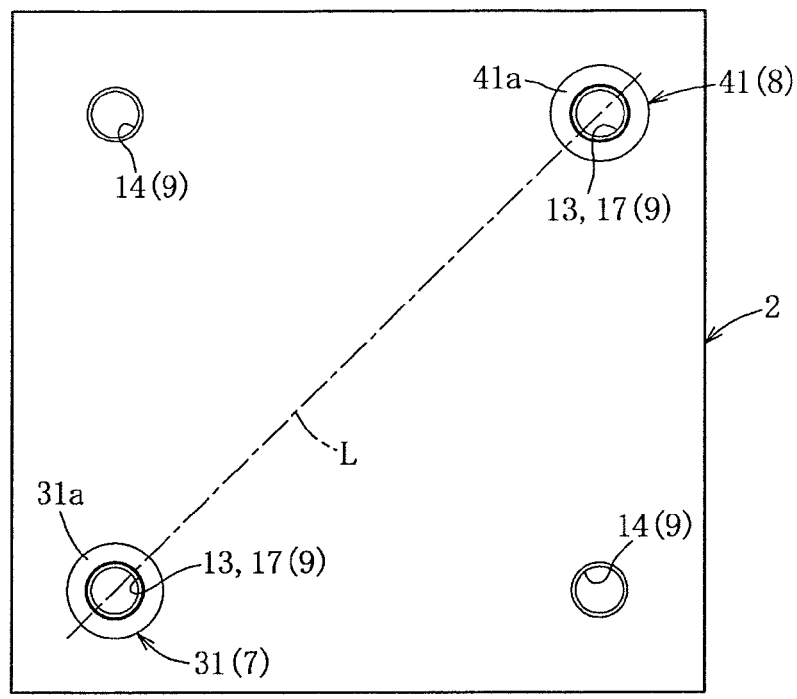
FIG. 3 is a plan view of a base member.

As shown in FIG. 1, a pallet positioning/fixing device according to a first embodiment (this corresponds to the "object positioning/fixing device", and hereinafter will be referred to as the "positioning/fixing device") positions a work pallet 3 (this corresponds to the "target object" that is positioned and fixed) for holding a workpiece that is to be supplied for machining process on a base member 2 in the horizontal direction and in the vertical direction, and fixes the pallet there with four fixing bolts 4, 4A.

This positioning/fixing device 1 comprises: a reference seating surface 5 that is formed on the upper surface of the base member 2; a contact surface 6 that is formed on the lower surface of the work pallet 3; a first positioning mechanism 7 that is capable of positioning the work pallet 3 in the horizontal direction; a second positioning mechanism 8 that is disposed in a position separated from this first positioning mechanism 7 and that performs regulation so that the work pallet 3 does not rotate within the horizontal plane around the first positioning mechanism 7 as a center; and a fixation mechanism 9 that is capable of pressing the work pallet 3 against the base member 2 and fixing it in position.

Each of the base member 2 and the work pallet 3 is made from thick steel as a flat plate member that is square or rectangular. The base member 2 is set up on, for example, a table of a machine tool or the like, and is fixed there. One or a plurality of workpieces (not shown in the figures) are fixed on the work pallet 3 by clamp devices or bolts not shown in the figures, this work pallet 3 is conveyed on to the base member 2, and machining process is performed on the one or a plurality of workpieces on the work pallet 3 after the pallet has been positioned and fixed in the horizontal direction and in the vertical direction.

Almost the entire area of the upper surface of the base member 2 is formed as the horizontal reference seating surface 5, which is for mounting the work pallet 3 and for seating the lower surface of the work pallet 3 so as to position the work pallet 3 in the vertical direction. And almost the entire area of the bottom surface of the work pallet 3 is formed as the horizontal contact surface 6, which can be contacted against the reference seating surface 5 in a surface contact state.

As shown in FIGS. 2 through 5, the base member 2 comprises: first and second fitting holes 11, 12 formed at locations near a pair of corner portions of this base member 2 that are in a diagonal relationship, and oriented in the vertical direction; a pair of first bolt holes 13 that continue downward from these first and second fitting holes 11, 12, and are oriented in the vertical direction; and a pair of second bolt holes 14 formed at locations near another pair of corner portions of this base member 2 that are in a diagonal relationship (the other pair of corner portions from the above pair of corner portions), and oriented in the vertical direction.

Figure 4:
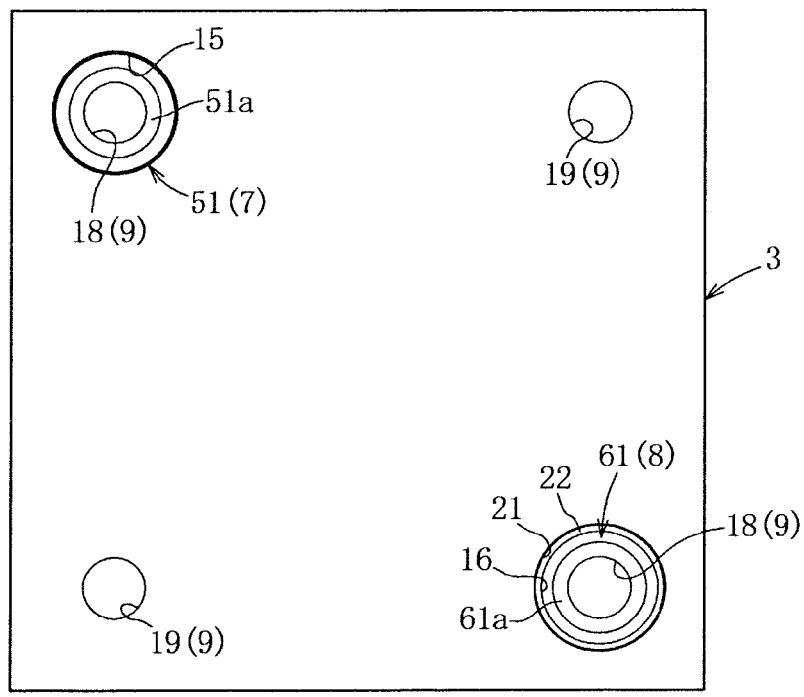
FIG. 4 is a bottom view of a work pallet.
Figure 5:
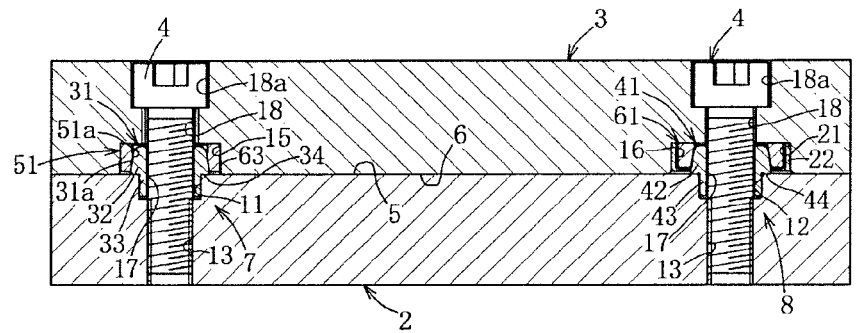
FIG. 5 is a sectional view taken along lines V-V in FIG. 2.

As shown in FIGS. 4 and 5, the work pallet 3 comprises: first and second installation holes 15, 16 oriented in the vertical direction and formed at locations near a pair of corners of the work pallet 3 that are in a diagonal relationship; a pair of second bolt passage holes 18 that are oriented in the vertical direction and that continue upward from these first and second installation holes 15, 16; a pair of head portion reception holes 18a at the upper portions of the second bolt passage holes 18; a pair of third bolt passage holes 19 oriented in the vertical direction and formed at locations near another pair of corners of the base member 2 that are in a diagonal relationship (the other pair of corner portions from the above pair of corner portions); and a pair of head portion reception holes 19a at the upper portions of the third bolt passage holes 19.

Figure 6:
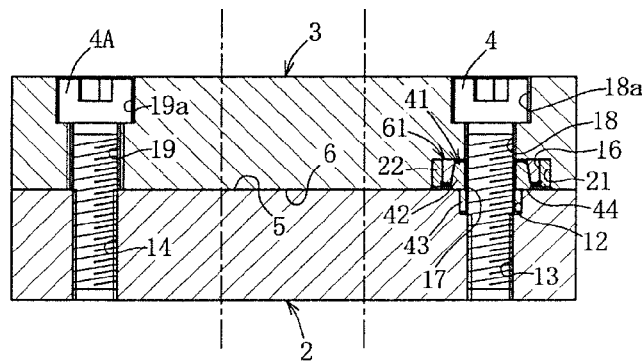
FIG. 6 is a sectional view taken along lines VI-VI in FIG. 2.
Figure 7:
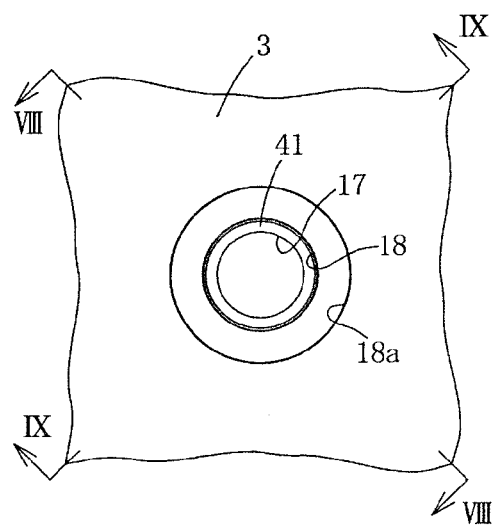
FIG. 7 is an enlarged view of essential portions, in a state in which bolts shown in FIG. 2 have been removed.

The pair of second bolt passage holes 18 are pierced through the work pallet 3 in its thickness direction, and are formed to be parallel with the axes of first and second reference members 31, 41 that will be described hereinafter and moreover so as to be concentric therewith. And the pair of third bolt passage holes 19 are pierced through the work pallet 3 in its thickness direction, and are formed to be concentric with the second bolt holes 14. It should be understood that first bolt passage holes 17 are formed in the first and second reference members 31, 41 (refer to FIGS. 4 through 6).

Since, due to the head portion reception holes 18a, 19a being formed, the upper surfaces of the head portions of the bolts 4, 4A are set to positions that are very slightly lower than the upper surface of the work pallet 3, accordingly this is advantageous for setting the workpiece or workpieces on the upper surface of the work pallet 3. It should be understood that, in this specification, the term "bolt passage hole"

means a hole that is capable of passing a bolt, while the term "bolt hole" means a threaded hole in which a bolt can be screwingly engaged.

Next, the first and second positioning mechanisms 7, 8 will be explained. As shown in FIGS. 1 through 15, the first and second positioning mechanisms 7, 8 respectively comprise: the first and second fitting holes 11, 12 that are formed in the base member 2; the first and second reference members 31, 41 that are installed in these first and second fitting holes 11, 12; the first and second installation holes 15, 16 that are formed in the work pallet 3; first and second annular engagement members 51, 61 that are installed in these first and second installation holes 15, 16; and so on.

Next, the first and second fitting holes 11, 12 will be explained.

As shown in FIGS. 5 through 13 and 15, the first and second fitting holes 11, 12 are both formed so as to open to the reference seating surface 5 of the base member 2 at positions that are separated from one another. The first and second fitting holes 11, 12 are both directly formed in the base member 2, and have circular shapes as seen in plan view.

Next, the first and second reference members 31, 41 will be explained. As shown in FIGS. 5 through 14, the first and second reference members 31, 41 respectively comprise: first and second convex engagement portions 32, 42; first and second fitting barrel portions 33, 43 that are formed integrally with these first and second convex engagement portions 32, 42 and whose diameters are smaller than the diameters of the first and second convex engagement portions 32, 42; and first and second base end contact surfaces 34, 44 that are formed integrally on the first and second convex engagement portions 32, 42.

For positioning in the horizontal direction, the first and second reference members 31, 41 are respectively fitted in the first and second fitting holes 11, 12. It should be understood that the second reference member 41 is provided for rotation regulation of the work pallet 3 around the first reference member 31 as a center (i.e. for positioning it in the horizontal plane), so that the work pallet 3 cannot rotate in the horizontal plane.

First and second tapered engagement surfaces 31a, 41a whose diameters become smaller upward (i.e. toward the work pallet 3 side) are formed on the external circumferences of the first and second convex engagement portions 32, 42 of the first and second reference members 31, 41. The upper end external circumferential portions of the first and second convex engagement portions 32, 42 are formed as circular arc shapes, as viewed in cross section. The annular first and second base end contact surfaces 34, 44 are formed on the base ends of the first and second convex engagement portions 32, 42 towards their first and second fitting barrel portions 33, 43, and contact against the reference seating surface 5. However, alternatively, it would also be acceptable for the first and second tapered engagement surfaces 31a, 41a to consist of a plurality of tapered engagement surfaces formed periodically around the circumferential direction.

It should be understood that, in the state in which the first and second base end contact surfaces 34, 44 of the first and second reference members 31, 41 are contacted against the reference seating surface 5, small annular clearances are defined between the bottom surfaces of the first and second fitting holes 11, 12 and the lower end surfaces of the first and second fitting barrel portions 33, 43 of the first and second reference members 31, 41. It would be acceptable for the first and second reference members 31, 41 to be fixed in the first and second fitting holes 11, 12 by being pressed thereinto, or it would also be possible for them to be fixed therein by some fixing means other than by being pressed thereinto.

The first bolt passage holes 17 are formed in the central portions of the first and second reference members 31, 41, and are oriented in the vertical direction. And the pair of first bolt holes 13, which are also oriented in the vertical direction, are formed in the base member 2 so as to correspond concentrically to the pair of first bolt passage holes 17. Moreover the second bolt passage holes 18 are formed at sites on the work pallet 3 that correspond to the first and second reference members 31, 41, and correspond concentrically to the first bolt passage holes 17.

As will be described hereinafter, the work pallet 3 is fixed to the base member 2 by the two bolts 4 that are passed through the pair of second bolt passage holes 18 on the work pallet 3 side and through the pair of first bolt passage holes 17 on the base member 2 side each being screwingly engaged into one of the pair of first bolt holes 13.

Next, the first and second installation holes 15, 16 will be explained.

As shown in FIGS. 5 through 13 and FIG. 16, the first and second installation holes 15, 16 are both formed so as to open to the contact surface 6 of the work pallet 3 at mutually separated positions. The first installation hole 15 is formed directly in the work pallet 3, in a circular shape as seen in plan view. And the second installation hole 16 is formed in a bush member 22 (refer to FIG. 16) that is installed by being fitted into a cylindrical hole 21 formed in the work pallet 3. The cylindrical hole 21 is formed in a circular shape as seen in plan view, and has a diameter that is approximately equal to, or somewhat larger than, the diameter of the first installation hole 15.

The bush member 22 is made in a cylindrical shape and is pressed and fixed into the cylindrical hole 21, but it could be fixed therein by some fixing means other than by being pressed thereinto. The second installation hole 16 is formed in the bush member 22, and is made in an approximately elliptical shape as seen in plan view (this shape having a long axis that is parallel to a line of centers L that will be described hereinafter), and the second annular engagement member 61 that will be described hereinafter is formed so as to be shiftable along the direction of the line of centers L that connects the axes of the first and second positioning mechanisms 7, 8. The second installation hole 16 has a pair of regulating surfaces 16a that are parallel to the direction of the line of centers L, and a pair of part cylindrical surfaces 16b between this pair of regulating surfaces 16a that are formed as shallow grooves and that are convex outward and oppose one another in the direction of the line of centers L.

The pair of regulating surfaces 16a are formed so as to oppose one another in the direction orthogonal, as seen in plan view, to the abovementioned line of centers L. The lengths of the pair of regulating surfaces 16a in the direction parallel to the line of centers L are around ⅙ to ⅛ of the circumference of the second installation hole 16. A circular arcuate convex portion 16c that projects inward in the radial direction is formed on the lower portion of each of the pair of part cylindrical surfaces 16b of the second installation hole 16, around its circumferential direction. Due to this pair of circular arcuate convex portions 16c, the second annular engagement member 61 that will be described hereinafter is prevented from falling out from the second installation hole 16 during transportation or due to vibration or the like.

It should be understood that the height dimension of the bush member 22 is set to be somewhat smaller than the depth dimension of the cylindrical hole 21 so that the lower end of the bush member 22 does not project below the contact surface 6, while the upper end of the bush member 22 contacts against the upper end wall surface of the cylindrical hole 21. Moreover, an annular reception surface 16*d* of the second installation hole 16 is defined on the upper end wall surface of the cylindrical hole 21, inward from the bush member 22.

Next, the first and second annular engagement members 51, 61 will be explained. As shown in FIGS. 4 through 13 and FIG. 15, the first and second annular engagement members 51, 61 can be engaged with the first and second convex engagement portions 32, 42 respectively, and are respectively installed in the first and second installation holes 15, 16 that are formed in the work pallet 3. The first annular engagement member 51 is fitted into and fixed into the first installation hole 15 by being pressed thereinto, but alternatively it could be fixed therein by some fixing means other than by being pressed thereinto. And the second annular engagement member 61 is installed into the second installation hole 16 so that some play is available therebetween.

The first and second annular engagement members 51, 61 are made so that they can be elastically deformed in the radially outward direction when they are respectively fitted over the first and second convex engagement portions 32, 42 of the first and second reference members 31, 41 and the engagement force of the bolts 4 operates, and moreover so that they can then be engaged in a closely contacting state to the first and second tapered engagement surfaces 31*a*, 41*a* of the first and second convex engagement portions 32, 42.

For this, the inner circumferential surfaces of the first and second annular engagement members 51, 61 are respectively formed as the first and second tapered contact surfaces 51*a*, 61*a*, so that they can closely engage to the first and second tapered engagement surfaces 31*a*, 41*a*. The thicknesses of the first and second annular engagement members 51, 61 in the radial direction should be such that they have the necessary rigidity for positioning in the horizontal direction.

Next, the aspects in which the structure of the second annular engagement member 61 differs from that of the first annular engagement member 51 will be explained. As shown in FIGS. 5 through 13 and FIG. 15, on the outer circumferential surface of the second annular engagement member 61, there are formed a pair of regulated surfaces 61*b* that can closely contact against the pair of regulating surfaces 16*a*, and there are also formed a pair of part cylindrical surfaces 61*c* that face the pair of part cylindrical surfaces 16*b* of the second installation hole 16. The lengths of the pair of regulated surfaces 61*b* in the direction parallel to the abovementioned line of centers L are around ⅙ to ⅛ of the circumference of the second annular engagement member 61. While a slit 61*d* is formed in the second annular engagement member 61 for promoting elastic deformation thereof in the radial direction, it would also be acceptable to omit this slit 61*d*.

Figure 10:
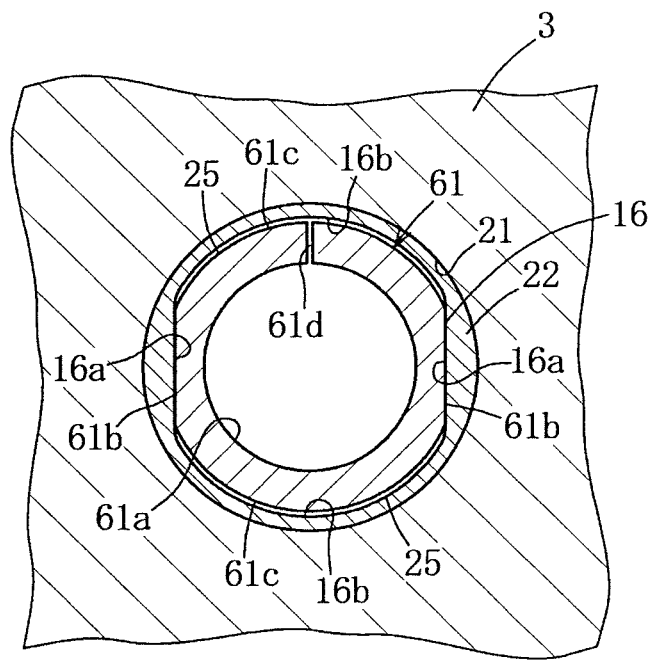
FIG. 10 is a sectional view taken along lines X-X in FIG. 8.

A pair of part cylindrical clearances 25 are defined between the pair of part cylindrical surfaces 61*c* of the second annular engagement member 61 and the pair of part cylindrical surfaces 16*b* of the second installation hole 16 (refer to FIG. 10). The pair of part cylindrical clearances 25 are formed so that, taking the axis of the second positioning mechanism 8 as a center, gaps of around ±50 μm are defined in the direction parallel to the line of centers L; but there is no particular limit on these distances. The height dimension of the second annular engagement member 61 is set to be somewhat smaller than the depth dimension of the second installation hole 16, so that the lower end of the second annular engagement member 61 does not project below the contact surface 6.

It should be understood that, in the state in which the second annular engagement member 61 is not engaged to the second reference member 41, the lower end of the second annular engagement member 61 is engaged by the pair of circular arcuate convex portions 16*c* of the bush member 22, a slight annular clearance is defined between the annular end surface 61*e* at the upper end of the second annular engagement member 61 and the annular reception surface 16*d* that forms the upper end wall surface of the second installation hole 16, and moreover slight clearances are defined between the pair of regulated surfaces 61*b* and the pair of regulating surfaces 16*a*.

Figure 11:
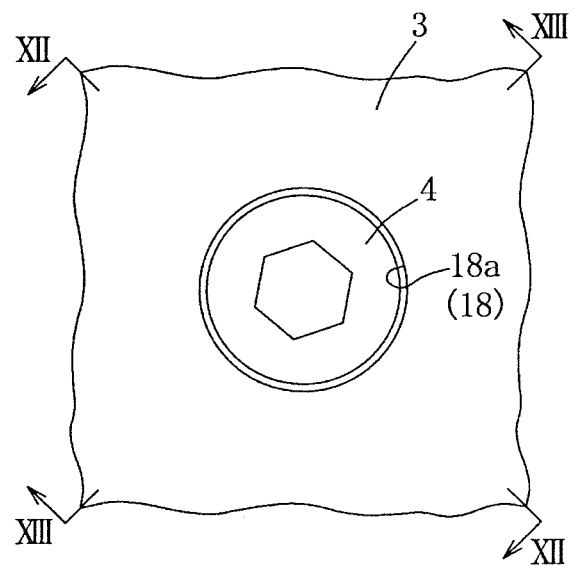
FIG. 11 is an enlarged view of essential portions of FIG. 2.
Figure 12:
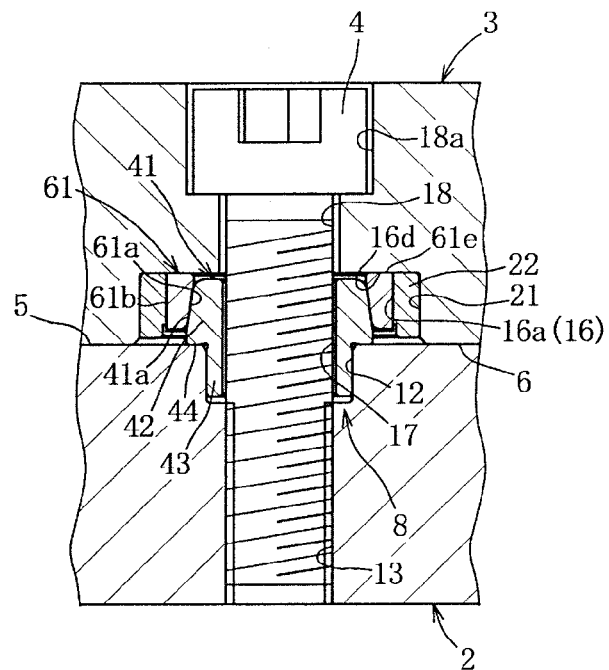
FIG. 12 is a sectional view taken along lines XII-XII in FIG. 11.
Figure 13:
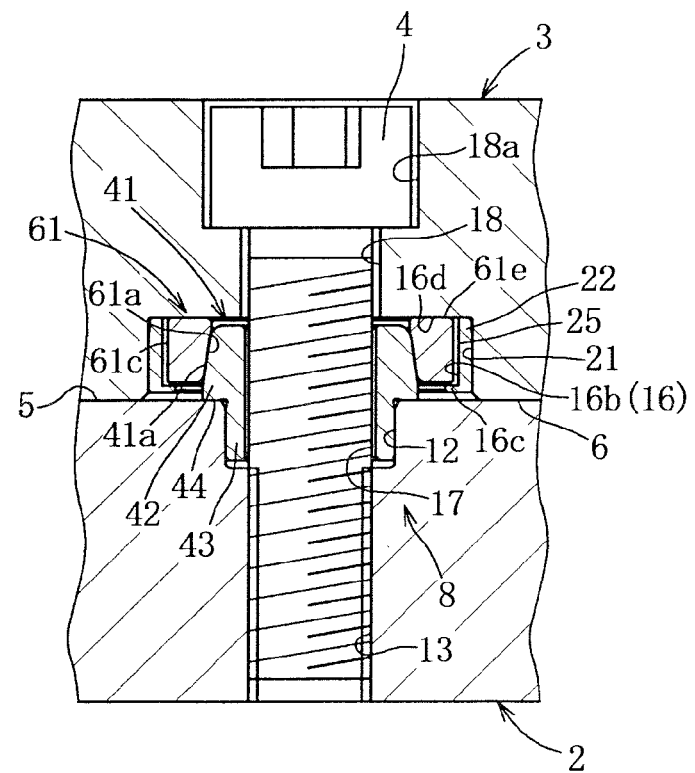
FIG. 13 is a sectional view taken along lines XIII-XIII in FIG. 11.
Figure 14:
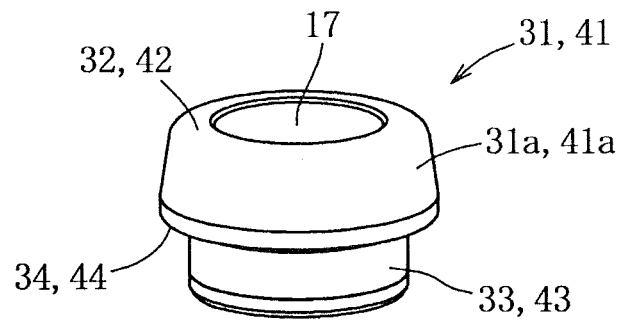
FIG. 14 is a perspective view of a second reference member.
Figure 15:
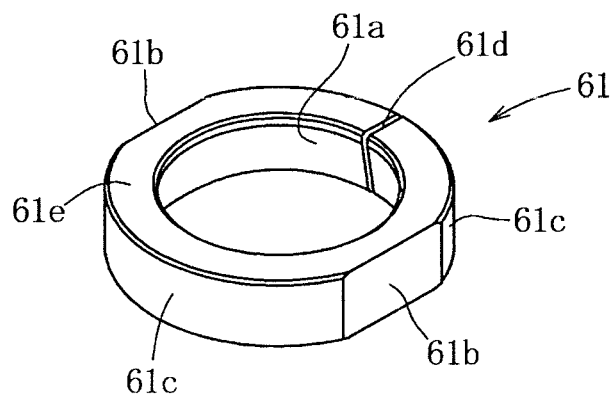
FIG. 15 is a perspective view of a second annular engagement member.
Figure 16:
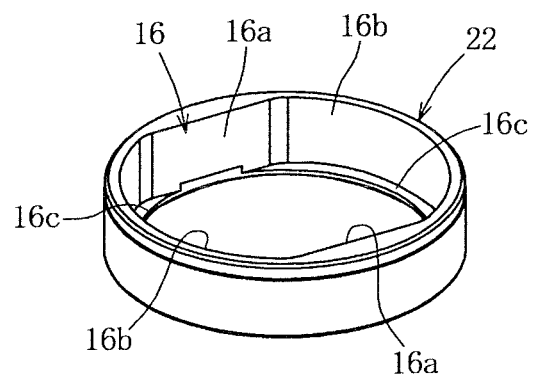
FIG. 16 is a perspective view of a bush member.
Figure 17:
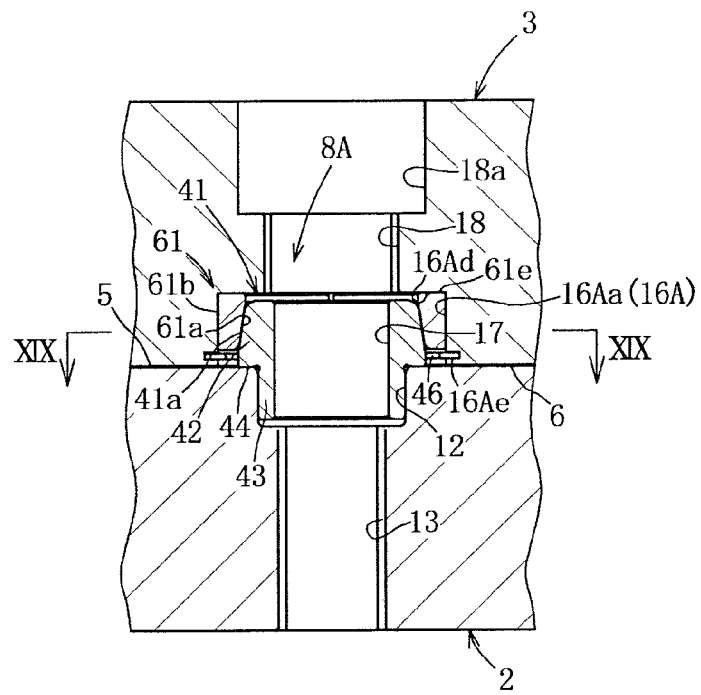
FIG. 17 is a figure corresponding to FIG. 8, and relating to a second embodiment.
Figure 18:
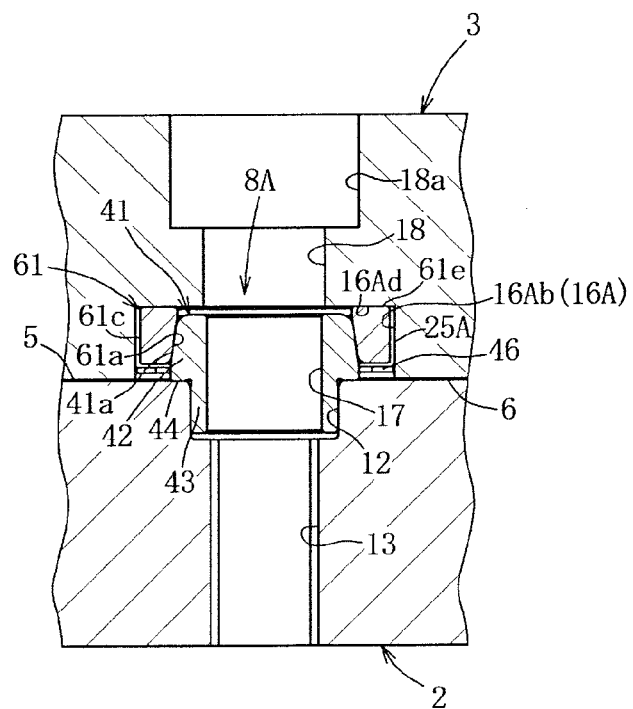
FIG. 18 is a figure corresponding to FIG. 9.
Figure 19:
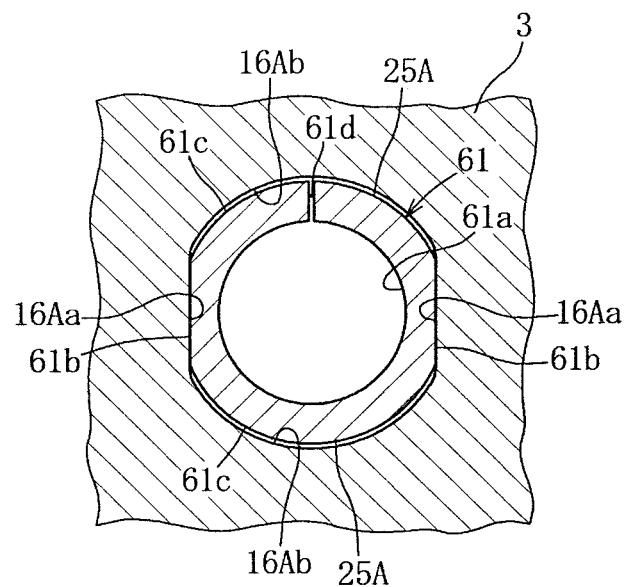
FIG. 19 is a sectional view taken along lines XIX-XIX in FIG. 17.

As shown in FIGS. 11 through 13, in the state in which the second annular engagement member 61 is engaged with the second reference member 41 in a closely contacting state, the annular end surface 61*e* of the second annular engagement member 61 is contacted against the annular reception surface 16*d* of the second installation hole 16 in a closely contacting state, and, via elastic deformation of the second annular engagement member 61, the pair of regulated surfaces 61*b* are contacted in a closely contacting state against the pair of regulating surfaces 16*a* of the second installation hole 16.

When the second annular engagement member 61 is installed in the second installation hole 16, before the bush member 22 is fitted into and fixed in the cylindrical hole 21, the second annular engagement member 61 is inserted into the second installation hole 16 so that the pair of regulated surfaces 61*b* are in a parallel state with respect to the pair of regulating surfaces 16*a*, and then the bush member 22 is fitted into and fixed in the cylindrical hole 21 from below in the state in which the lower end of the second annular engagement member 61 is engaged with the pair of circular arcuate convex portions 16*c*.

In the first annular engagement member 51, it should be understood that the external diameter of the lower half portion of the first annular engagement member 51 is formed to be slightly smaller than the external diameter of its upper half portion, so that an annular clearance 63 is defined between the outer circumferential surface of the lower half portion of the first annular engagement member 51 and the inner circumferential surface of the first installation hole 15 in order to promote elastic deformation of the first annular engagement member 51 in the radially outward direction. The height dimension of the first annular engagement member 51 is set to be somewhat smaller than the depth dimension of the first installation hole, so that the lower end of the first annular engagement member 51 does not project lower than the contact surface 6, while the annular end surface of the upper end of the first annular engagement member 51 is contacted closely against the annular end surface that forms the upper end wall surface of the first installation hole 15.

The fixation mechanism 9 comprises the first bolt passage holes 17 of the first and second reference members 31, 41, the pair of second bolt passage holes 18 and the pair of third bolt passage holes 19 formed in the work pallet 3, the pair of first bolt holes 13 and the pair of second bolt holes 14 formed in the base member 2, the four bolts 4, 4A, and so on.

Next, the operation of the positioning/fixing device 1 described above will be explained. The base member 2 is set on a table of a machine tool in advance, and is fixed there. In a work preparation stage, in a state in which one or a plurality of workpieces are attached on a work pallet 3, the work pallet 3 is conveyed onto the base member 2, and is mounted on the reference seating surface 5 of the upper surface of the base member 2 in a contacting state.

Figure 8:
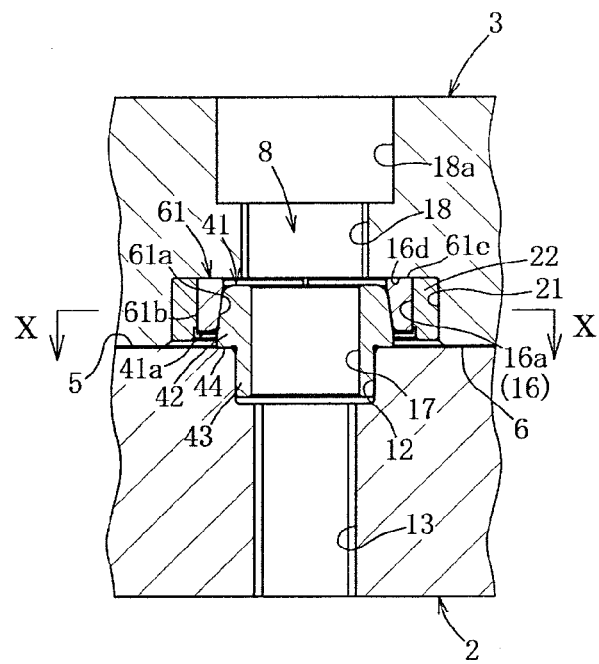
FIG. 8 is a sectional view taken along lines VIII-VIII in FIG. 7.
Figure 9:
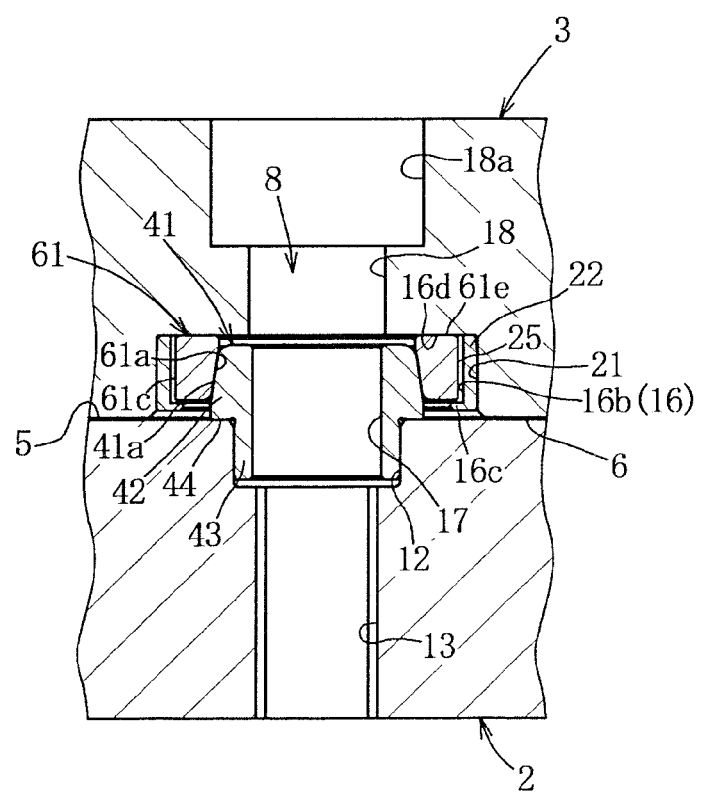
FIG. 9 is a sectional view taken along lines IX-IX in FIG. 7.

In this state, as shown in FIGS. 8 and 9, the first and second annular engagement members 51, 61 on the work pallet 3 side are lightly engaged to the first and second convex engagement portions 32, 42 on the first and second reference members 31, 41. On the first and second reference members 31, 41, the first and second base end contact surfaces 34, 44 are in the state of being contacted against the reference seating surface 5; and, on the first annular engagement member 51, the annular end surface on its upper end is contacted against the annular reception surface of the first installation hole 15, while the tapered contact surface 51a on its inner circumferential surface is in the state of being lightly contacted against the first tapered engagement surface 31a of the first reference member 31.

Moreover, the second annular engagement member 61 is shifted upward along with engagement of the second reference member 41, and the tapered contact surface 61a of its inner circumferential surface comes into light contact against the second tapered engagement surface 41a of the second reference member 41, and moreover the pair of regulated surfaces 61b on its outer circumferential surface come into light contact with or approach the pair of regulating surfaces 16a of the second installation hole 16, while the annular end surface 61e at its upper end is in the state of lightly contacting the annular reception surface 16d of the second installation hole 16.

Next, as shown in FIGS. 12 and 13, by the two bolts 4 being inserted into the pair of second bolt passage holes 18, and by both being screwingly engaged into and tightened in the corresponding first bolt holes 13 while in the state of passing through the first bolt passage holes 17 of the first and second reference members 31, 41, the first and second annular engagement members 51, 61 are elastically deformed in the radially outward direction, so that the first and second tapered contact surfaces 51a, 61a of their inner circumferential surfaces are engaged and fixed to the first and second tapered engagement surfaces 31a, 41a. The position of the work pallet 3 in the horizontal direction is determined by the first positioning mechanism 7, while the work pallet 3 is regulated by the second positioning mechanism 8 so that it does not rotate within the horizontal plane about the first positioning mechanism 7 as a center.

At this time, with regard to the second annular engagement member 61 of the second positioning mechanism 8: in the state in which the work pallet 3 is pressed against the base member 2 and fixed to it by the two bolts 4, the second annular engagement member 61 is elastically deformed in the radially outward direction and is pressed into the second installation hole 16, and the pair of regulated surfaces 61b of the second annular engagement member 61 are engaged in close contact with the pair of regulating surfaces 16a of the second installation hole 16, while the annular end surface 61e of the second annular engagement member 61 is held against the annular reception surface 16d of the second installation hole 16 in a closely contacting state.

Now in some cases, due to errors in the machining process of the various members, errors in the positioning of the first and second fitting holes 11, 12, or errors in the positioning of the first and second installation holes 15, 16 (of the order of a few tens of μm) or the like, it may happen that the distance between the axes of the first and second reference members 31, 41 and the distance between the axes of the first and second annular engagement members 51, 61 are not equal to one another. However, with this positioning/fixing device 1, the second annular engagement member 61 is shiftable along the direction of the line of centers L via the pair of part cylindrical clearances 25, while, due to the pair of regulating surfaces 16a and the pair of regulated surfaces 61b, it is not shiftable in the direction along the direction orthogonal to the line of centers L.

Due to this, if there is some deviation between the distance between the axes of the first and second reference members 31, 41 and the distance between the axes of the first and second annular engagement members 51, 61 of the work pallet 3, then, by shifting the second annular engagement member 61 along the line of centers L slightly with respect to the first annular engagement member 51, it is possible to absorb this deviation and to automatically adjust the interaxial distance. At this time since, in addition to the bidirectional constraint performed by the second reference member 41, the second annular engagement member 61 and the reference seating surface 5, and the contact surface 6, also a bidirectional constraint is performed by the pair of regulating surfaces 16a of the second installation hole 16, the pair of regulated surfaces 61b of the second annular engagement member 61 and the annular reception surface 16d of the second installation hole, and the annular end surface 61e of the second annular engagement member 61, accordingly it is possible to position the work pallet 3 with good accuracy with respect to the base member 2, both in the horizontal direction and in the vertical direction.

And, by inserting the two bolts 4A into the third bolt passage holes 18 and screwingly engaging them into the second bolt holes 14 of the base member 2 and tightening them up, the portions of the work pallet 3 in the neighborhood of the other pair of corner portions thereof are fixed to the base member 2, and thereby the work pallet 3 is more solidly fixed to the base member 2.

In this manner, the first tapered contact surface 51a of the first annular engagement member 51 is positioned in the horizontal direction by being closely contacted to the first tapered engagement surface 31a of the first reference member 31, and moreover the second tapered contact surface 61a of the second annular engagement member 61 is regulated by being closely contacted to the second tapered engagement surface 41a of the second reference member 41 so that it does not rotate within the horizontal plane around the axis of the first reference member 31 as a center, and is positioned in the horizontal direction. And, in this manner, it is possible to position the work pallet 3 with respect to the base member 2 with good accuracy both in the vertical direction and in the horizontal direction, and also to regulate it so that it does not rotate within the horizontal plane.

Next, the advantageous effects provided by the positioning/fixing device 1 described above will be explained.

Even if there is some deviation between the distance between the axes of the first and second reference members 31, 41 and the axes of the first and second annular engagement members 51, 61, since, when the second annular engagement member 61 is engaged to the second reference member 41, the second annular engagement member 61 is fixed after having automatically been shifted in the direction parallel to the line of centers L, accordingly it is possible to absorb positional deviation of the second annular engagement member 61 with respect to the second reference member 41 (a tolerance between pitches of, for example, around 10 to 100 μm). For this reason, even if the distance between the axes of the first and second annular engagement members 51, 61 has not been set at high accuracy, still it is possible to establish the state in which the inner circumferential surface of the second annular engagement member 61 has reliably been closely contacted to the second tapered engagement surface 41a of the second reference member 41 and to position and fix the work pallet 3 on the base member 2, so that it is possible to improve the accuracy of positioning of the work pallet 3 in the horizontal direction, and it is possible to improve the accuracy by which its rotation is regulated in the horizontal plane.

Moreover, since the second annular engagement member 61 is made to be shiftable along the direction parallel to the line of centers L, accordingly it is possible to make the second tapered engagement surface 41a of the second reference member 41 in an annular shape, and, since it can be reliably engaged with the inner circumferential surface of the second annular engagement member 61 in a closely contacting state, accordingly it is possible to prevent the second tapered engagement surface 41a from suffering wear and tear and being damaged, and thereby it is possible to improve the durability of the second positioning mechanism 8.

Furthermore, since the first and second base end contact surfaces 34, 44 of the first and second convex engagement portions 32, 42 are contacted against the reference seating surface 5, and thus it is possible to improve the accuracy of positioning of the first and second convex engagement portions 32, 42 in the height direction with respect to the reference seating surface 5, accordingly it is possible to improve the accuracy of positioning the work pallet 3 with respect to the base member 2 in the horizontal direction. Moreover, since it is arranged to fit the first and second fitting barrel portions 33, 43 of the first and second reference members 31, 41 into the first and second fitting holes 11, 12 and to fix them there, and since the first and second fitting barrel portions 33, 43 have external diameters that are smaller than those of the first and second convex engagement portions 32, 42, accordingly it is possible to simplify the structure of the first and second reference members 31, 41 and to make them more compact, so that it is possible greatly to reduce the production cost (the cost of material, the cost of machining process, and the cost of assembly).

Since the fixation mechanism 9 comprises the first bolt passage holes 17 that are formed in the first and second reference members 31, 41, the second bolt passage holes 18 that are formed in the work pallet 3 so as to correspond to these first bolt passage holes 17, and the first bolt holes 13 that are formed in the base member 2 so as to correspond to the first and second bolt passage holes 18, and since the bolt engagement force does not operate directly on the first and second reference members 31, 41, accordingly there is no fear of the first and second fitting barrel portions 33, 43 of the first and second reference members 31, 41 shifting with respect to the first and second fitting holes 11, 12, and this is advantageous from the point of view of ensuring the accuracy of positioning in the horizontal direction by the first and second reference members 31, 41.

And, since the slit 61d is formed in the second annular engagement member 61 for promoting elastic deformation thereof in the radial direction, accordingly it is possible to promote elastic deformation of the second annular engagement member 61 via the slit 61d that is formed in the second annular engagement member 61.

Moreover, since the second installation hole 16 is formed in the bush member 22 that is installed in and fitted into the cylindrical hole 21 which is formed in the work pallet 3, accordingly it is simple and easy to manufacture the second installation hole 16.

Embodiment 2

Next, a second installation hole 16A of a second positioning mechanism 8A of a second embodiment in which the second installation hole 16 of the second positioning mechanism 8 in the position fixing device 1 of the first embodiment has been partially altered will be explained. It should be understood that, while the second installation hole 16 of the first embodiment was formed in the bush member 22 that was installed into and fitted in the cylinder hole 21, the cylinder installation hole 16A of the second embodiment is formed directly in the work pallet 3.

As shown in FIGS. 17 through 22, in the second positioning mechanism 8A, the second installation hole 16A is formed directly in the work pallet 3 in an approximately elliptical shape as seen in plan view, so as to open to the contact surface 6 of the work pallet 3. The second installation hole 16A is formed so that the second annular engagement member 61 is shiftable in the direction of the line of centers L that connects between the axes of the first and second positioning mechanisms 7 and 8A. The second installation hole 16A comprises a pair of regulating surfaces 16Aa that are parallel to the direction of the line of centers L, and a pair of part cylindrical surfaces 16Ab that are convex outward and that oppose one another along the direction of the line of centers L. A pair of part cylindrical clearances 25A are defined between the pair of part cylindrical surfaces 61c of the second annular engagement member 61 and the pair of part cylindrical surfaces 16Ab of the second installation hole 16A (refer to FIG. 19).

The pair of regulating surfaces 16Aa are formed so as to oppose one another, as seen in plan view, in the direction orthogonal to the abovementioned line of centers L. The lengths of the pair of regulating surfaces 16Aa in the direction parallel to the line of centers L are around ⅙ to ⅛ of the circumference of the second installation hole 16A. The height dimension of the second annular engagement member 61 is set to be somewhat smaller than the depth dimension of the second installation hole 16A, so that the lower end of the second annular engagement member 61 does not project below the contact surface 6.

A pair of horizontal groove portions 16Ae in which a retainer ring 46 can be installed are formed on the lower side portions of the pair of regulating surfaces 16Aa of the second installation hole 16A, and both end portions of the retainer ring 46 in the direction orthogonal to the line of centers L are partially fitted into this pair of horizontal groove portions 16Ae. Due to this retainer ring 46, the second annular engagement member 61 is prevented from falling out from the second installation hole 16A during transportation or due to vibration or the like.

It should be understood that, in the state in which the second annular engagement member 61 is not engaged with the second reference member 41, the lower end of the second annular engagement member 61 is engaged by the retainer ring 46 which is installed in the second installation hole 16A, and a slight annular clearance is defined between the annular end surface 61e at the upper end of the second annular engagement member 61 and the annular reception surface 16Ad of the second installation hole 16A, while minute clearances are defined between the pair of regulated surfaces 61b and the pair of regulating surfaces 16Aa.

Figure 20:
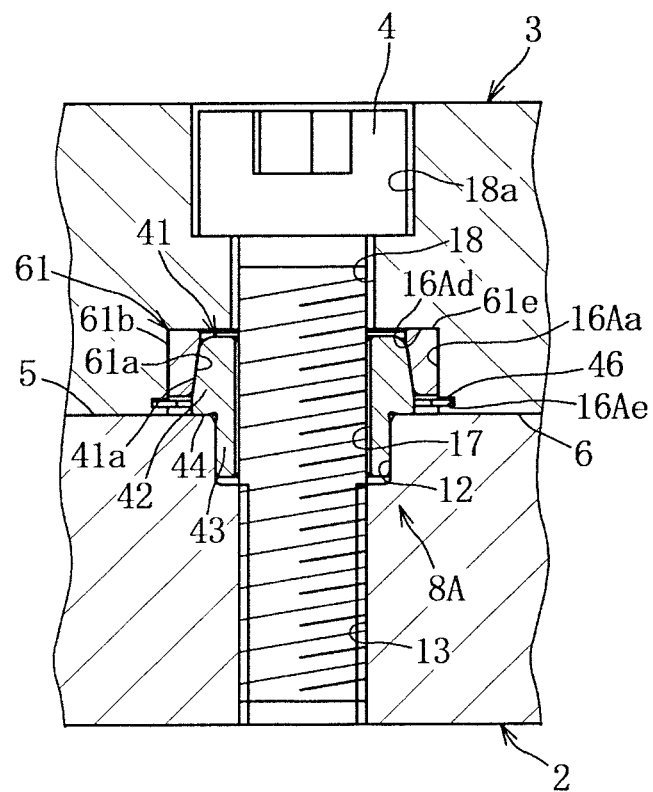
FIG. 20 is a figure corresponding to FIG. 12.
Figure 21:
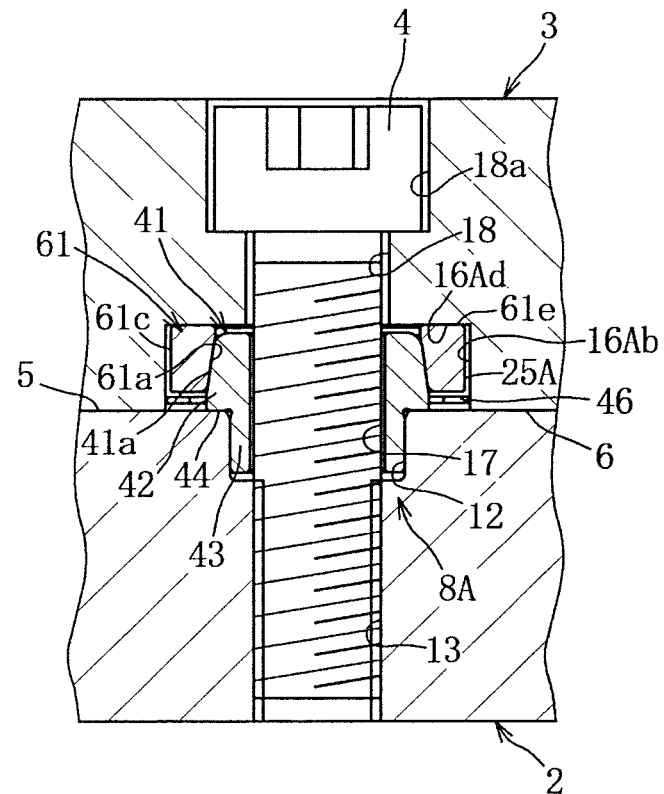
FIG. 21 is a figure corresponding to FIG. 13.
Figure 22:
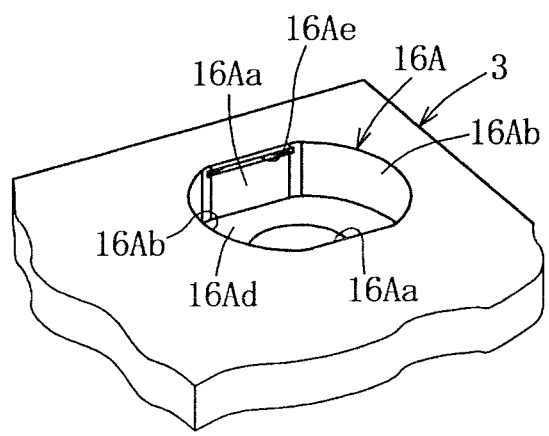
FIG. 22 is a perspective view of a second installation hole.
Figure 23:
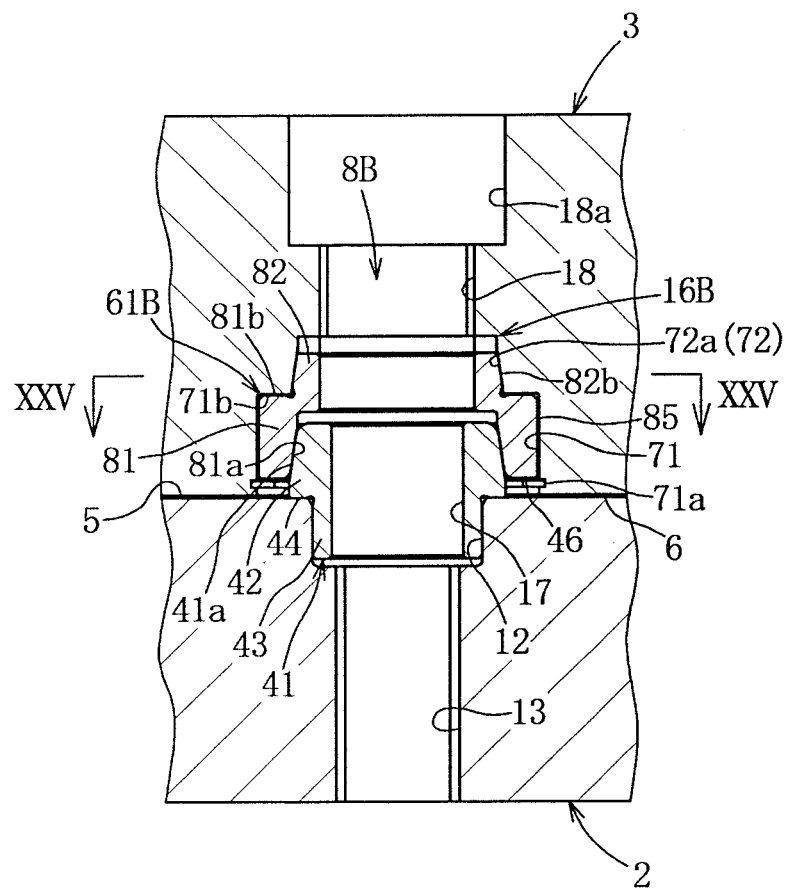
FIG. 23 is a figure corresponding to FIG. 8, and relating to a third embodiment.
Figure 24:
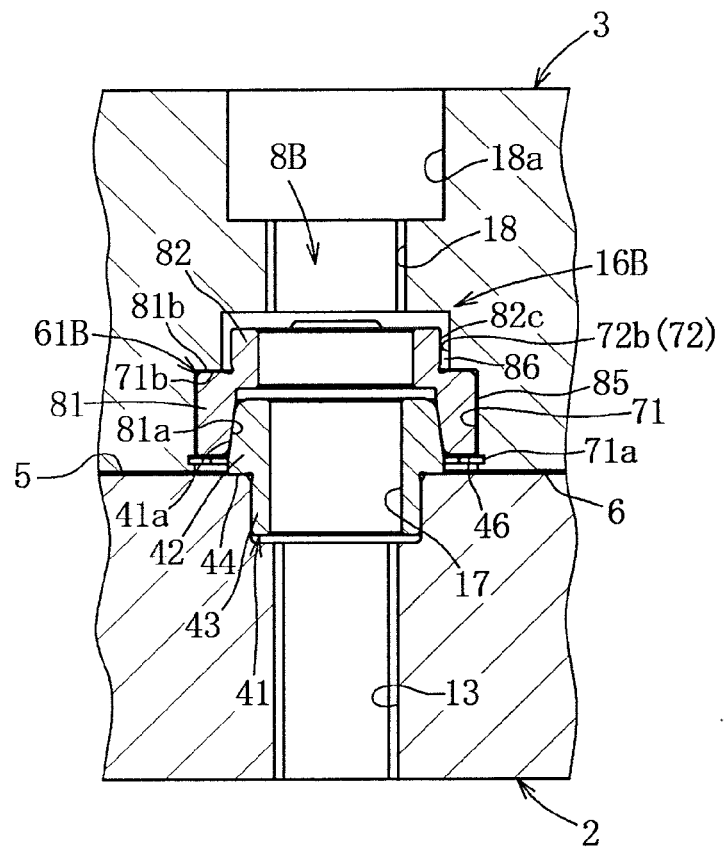
FIG. 24 is a figure corresponding to FIG. 9.
Figure 25:
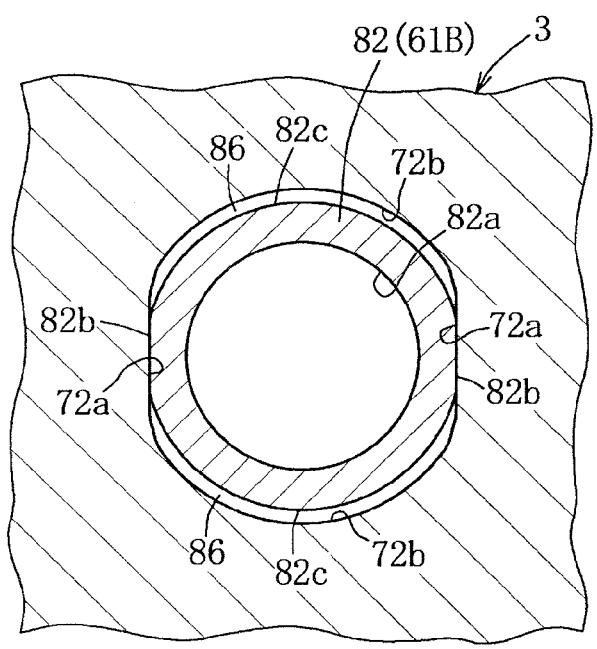
FIG. 25 is a sectional view taken along lines XXV-XXV in FIG. 23.

And, as shown in FIGS. 20 and 21, in the state in which the second annular engagement member 61 is engaged with the second reference member 41 in a closely contacting state, the annular end surface 61e of the second annular engagement member 61 is contacted against the annular reception surface 16Ad of the second installation hole 16A in a closely contacting state, while, due to elastic deformation of the second annular engagement member 61, the pair of regulated surface 61b are contacted against the pair of regulating surfaces 16Aa of the second installation hole 16A in a closely contacting state.

Since this second installation hole 16A is formed directly in the work pallet 3, it is possible to produce a structure that can permit a certain pitch tolerance between the first and second annular engagement members 51, 61 by implementing an process of modification of an already existing installation hole in order to fit in the second annular engagement member 61. The other structures, the operation, and the beneficial effects of this second embodiment are the same as in the case of the first embodiment, and accordingly the same reference symbols are appended to components that are similar to ones of the first embodiment, and detailed explanation thereof is omitted.

Embodiment 3

Next, a second installation hole 16B of a second positioning mechanism 8B and a second annular engagement member 61B of a third embodiment in which the second installation hole 16 of the second positioning mechanism 8 and the second annular engagement member 61 in the position fixing device 1 of the first embodiment have been partially altered will be explained.

First, the second installation hole 16B will be explained.

As shown in FIGS. 23 through 27 and FIG. 29, the second installation hole 16B comprises a main installation hole portion 71 in which an main annular portion 81 of a second annular engagement member 61B is contained so as to be shiftable in the horizontal direction, and a small diameter installation hole portion 72 that communicates with this main installation hole portion 71, and in which a small diameter annular portion 82 of the second annular engagement member 61B is contained so as to be shiftable along the direction of the line of centers L.

The main installation hole portion 71 is formed so as to open directly to the contact surface 6 of the work pallet 3, and has a circular shape as seen in plan view. An annular groove portion 71a in which a retainer ring 46 can be installed is formed around the entire circumference of the lower end portion of the main installation hole portion 71 towards the contact surface 6, and the retainer ring 46 is fitted into and fixed in this annular groove portion 71a. This retainer ring 46 prevents the second annular engagement member 61B from falling out from the second installation hole 16B during transportation or due to vibration or the like.

The small diameter installation hole portion 72 is formed in an approximately elliptical shape as seen in plan view, and comprises a pair of tapered regulating surfaces 72a that are formed on its internal circumferential portion and are sloped so as to approach one another in the direction away from the second convex engagement portion 42, and a pair of part cylindrical surfaces 72b that are formed between this pair of tapered regulating surfaces 72a and are convex outwards. The pair of tapered regulating surfaces 72a are formed so as to oppose one another in the direction orthogonal to the abovementioned line of centers L, as seen in plan view. The lengths of the pair of tapered regulating surfaces 72a in the direction parallel to the line of centers L are around ⅙ to ⅛ of the length of the circumference of the small diameter installation hole portion 72.

Next, the second annular engagement member 61B will be explained. As shown in FIGS. 23 through 28, the second annular engagement member 61B comprises a main annular portion 81 to which the second convex engagement portion 42 is engaged, and a small diameter annular portion 82 that is formed integrally therewith so as to extend from the end portion opposite to one end of this main annular portion 81 away from that one end, and whose diameter is smaller than that of the main annular portion 81. The external diameter of the main annular portion 81 of the second annular engagement member 61B is formed to be smaller than the diameter of the main installation hole portion 71, so that a cylindrical clearance 85 is defined between the outer circumferential surface of the main annular portion 81 and the inner circumferential surface of the main installation hole portion 71.

The main annular portion 81 is fitted over the second convex engagement portion 42 and is capable of being elastically deformed in the direction to increase its radius due to the operation of the engagement force of the bolt 4, and a second tapered contact surface 81a is formed thereon whose inner circumferential surface is capable of engaging in a closely contacting state with the second tapered engagement surface 41a of the second convex engagement portion 42. The thickness of the main annular portion 81 in the radial direction should be such that it has the necessary rigidity for positioning in the horizontal direction.

A bolt passage hole 82a is formed in the central portion of the small diameter annular portion 82, and is oriented in the vertical direction. The small diameter annular portion 82 comprises a pair of tapered regulated surfaces 82b formed on its outer circumferential surface that can be closely contacted with the pair of tapered regulating surfaces 72a, and a pair of part cylindrical surfaces 82c that are formed between this pair of tapered regulated surfaces 82b. A pair of part cylindrical clearances 86 are defined between the pair of part cylindrical surfaces 82c of the second annular engagement member 61B and the pair of part cylindrical surfaces 72b of the second installation hole 16B (refer to FIG. 25).

The height dimension of the main annular portion 81 is set to be somewhat smaller than the depth dimension of the main installation hole portion 71, so that the lower end of the main annular portion 81 does not project below the contact surface 6, and the height dimension of the small diameter annular portion 82 is set to be somewhat smaller than the depth dimension of the small diameter installation hole portion 72, so that the upper end of the small diameter annular portion 82 does not contact against the upper end wall surface of the small diameter installation hole portion 72.

It should be understood that, in the state in which the second annular engagement member 61B is not engaged with the second reference member 41, the lower end of the main annular portion 81 is engaged with the retainer ring 46, and a slight annular clearance is defined between the annular end surface 81b at the upper end of the main annular portion 81 and the annular reception surface 71b of the main installation hole portion 71, while minute clearances are defined between the pair of tapered regulated surfaces 82b of the small diameter annular portion 82 and the pair of tapered regulating surfaces 72a of the small diameter installation hole portion 72.

Figure 26:
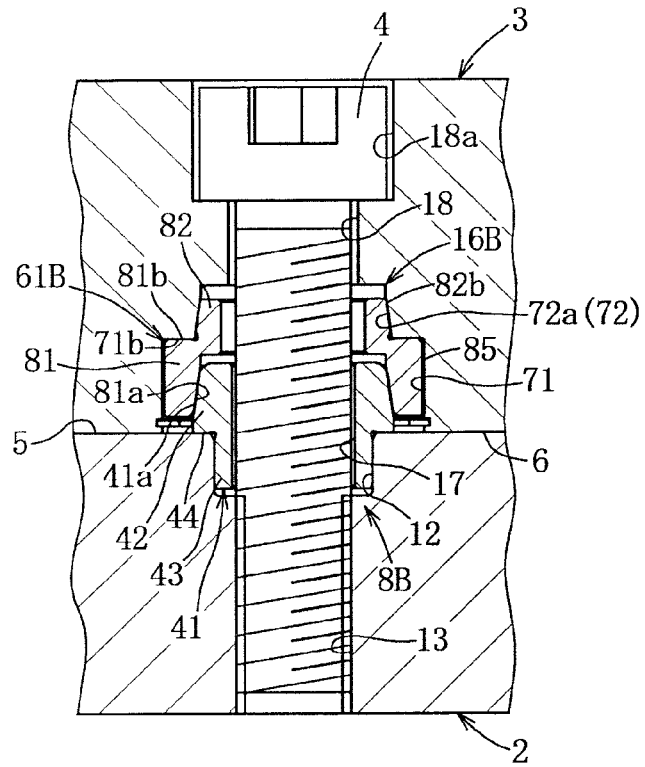
FIG. 26 is a figure corresponding to FIG. 12.
Figure 27:
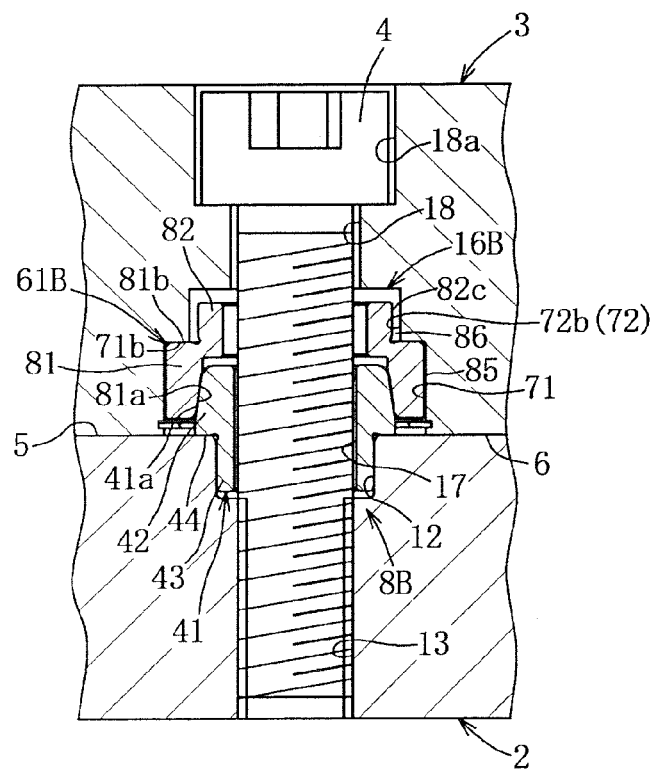
FIG. 27 is a figure corresponding to FIG. 13.
Figure 28:
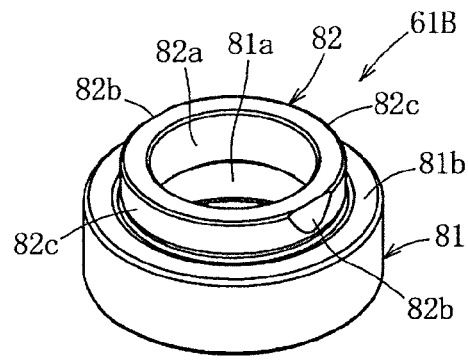
FIG. 28 is a perspective view of a second annular engagement member.
Figure 29:
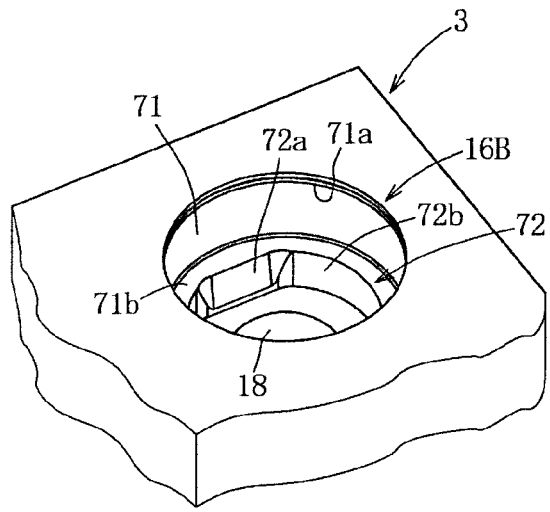
FIG. 29 is a perspective view of a second installation hole.

As shown in FIGS. 26 and 27, in the state in which the second annular engagement member 61B is engaged with the second reference member 41 in a closely contacting state, the annular end surface 81b of the main annular portion 81 contacts against the annular reception surface 71b of the main installation hole portion 71 in a closely contacting state, and, via elastic deformation of the second annular engagement member 61B, the pair of tapered regulated surfaces 82b contact against the pair of tapered regulating surfaces 72a of the small diameter installation hole portion 72 in a closely contacting state.

By executing additional machining process on an already existing installation hole in order to fit in the second annular engagement member 61B, it is possible to provide a structure that is capable of absorbing a certain pitch tolerance between the first and second annular members 51, 61B, since: the second annular engagement member 61B comprises the main annular portion 81 and the small diameter annular portion 82 that is smaller in diameter than this main annular portion 81; the second installation hole 16B comprises the main installation hole portion 71 in which the main annular portion 81 is received and the small diameter installation hole portion 72 in which the small diameter annular portion 82 is received; the pair of tapered regulating surfaces 72a that are tilted so as to approach towards one another in the direction away from the second convex engagement portion 42, which correspond to the pair of regulating surfaces 16a, 16Aa of the first and second embodiments described above, are formed on the internal circumferential portion of the small diameter installation hole portion 72; and the pair of regulated surfaces 61b are formed on the small diameter annular portion 82 and are capable of coming into close contact with the pair of tapered regulating surfaces 72a. The other structures, the operation, and the beneficial effects of this third embodiment are the same as in the case of the first embodiment, and accordingly the same reference symbols are appended to components that are similar to ones of the first embodiment, and detailed explanation thereof is omitted.

Embodiment 4

Next, a positioning/fixing device 1C of a fourth embodiment in which the positioning/fixing device 1 of the first embodiment has been partially altered will be explained. It should be understood that, in the positioning/fixing device 1C of the fourth embodiment, the first and second reference members 31, 41 are attached on the work pallet 3C side, while the first and second annular engagement members 51, 61 are attached on the base member 2C side.

Figure 30:
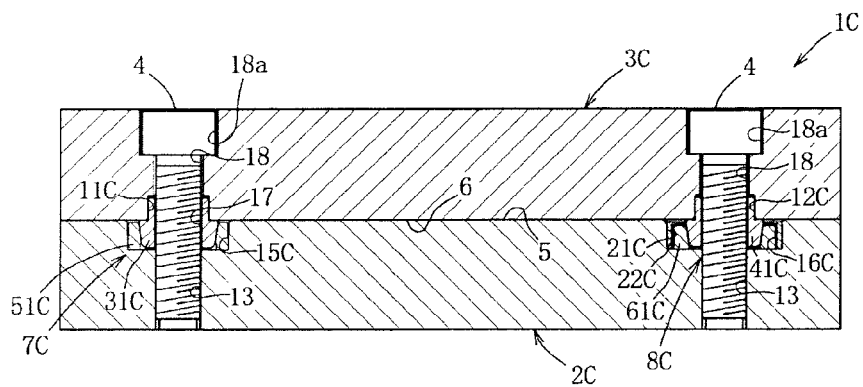
FIG. 30 is a sectional view of a pallet positioning/fixing device according to a fourth embodiment.

As shown in FIG. 30, with the positioning/fixing device 1C, first and second reference members 31C, 41C are installed in first and second fitting holes 11C, 12C that are formed in a work pallet 3C, and first and second annular engagement members 51C, 61C are installed in first and second installation holes 15C, 16C that are formed in a base member 2C. In a similar manner to the case with the first embodiment, the second installation hole 16C is formed in a bush member 22C that is installed closely into a cylindrical hole 21C that is formed in the base member 2C. In other words, the first and second positioning mechanisms 7C, 8C of the fourth embodiment have a reversed construction, as compared with those of the first embodiment.

In this case, second bolt passage holes 18 and head portion reception hole 18a thereof are formed in the work pallet 3C at positions corresponding to the first and second reference members 31C, 41C, while first bolt holes 13 that correspond to the first bolt passage holes 17 of the first and second reference members 31C, 41C are formed in the base member 2B. The other structures, the operation, and the beneficial effects of this fourth embodiment are the same as in the case of the first embodiment, and accordingly the same reference symbols are appended to components that are similar to ones of the first embodiment, and detailed explanation thereof is omitted.

It should be understood that, while the second installation hole 16C is formed on the bush member 22C that is installed in the cylindrical hole 21C formed in the base member 2C, alternatively, in a similar manner to the case with the second embodiment, it would also be possible to form the second installation hole 16C directly in the base member 2C.

Next, versions in which the above Embodiments #1 through #4 are partially altered will be explained.

Figure 31:
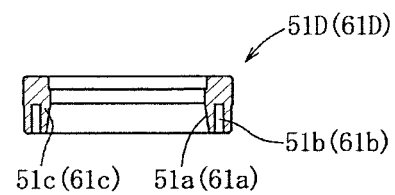
FIG. 31 is a sectional view of first and second annular engagement members according to a partially altered embodiment.

[1] In order to promote elastic deformation of the first and second annular engagement members 51, 61 in the radially outward direction, as shown in FIG. 31, deep annular grooves 51b, 61b that open towards the base member 2 may be formed in, for example, the lower halves of first and second annular engagement members 51D, 61D, and annular engagement wall portions 51c, 61c that can be elastically deformed in the radially outward direction may be formed in the portions of the first and second annular engagement members 51D, 61D that are inward of the annular grooves 51b, 61b. It should be understood that, if the annular groove 61b is formed in the second annular engagement member 61, the slit 61d may be omitted.

According to this structure, since the annular grooves 51b, 61b for promoting elastic deformation of the first and second annular engagement members 51D, 61D and that open towards the base member 2 are formed in at least portions between the outer circumferential surfaces of the first and second annular engagement members 51D, 61D and the first and second tapered contact surfaces 51a, 61a, accordingly it is possible to promote elastic deformation of the first and second annular engagement members 51D, 61D via the annular grooves 51b, 61b that are formed in the first and second annular engagement members 51D, 61D. It should be understood that, if the first and second annular engagement members 51, 61 are installed in the base member 2, then it will be acceptable to form the annular grooves 51b, 61b so that they open towards the work pallet 3.

In order to promote elastic deformation of the abovementioned first and second annular engagement members 51, 61 in the radial direction, it would also be acceptable to form divided sections (similar to the slit 61d of the first embodiment) by dividing each of the first and second engagement members 51, 61 at one spot along its circumferential direction, or to form partially divided sections by partially dividing each of the first and second engagement members 51, 61 at a plurality of spots along its circumferential direction.

It would also be acceptable to build the first and second reference members 31, 41 so that they are elastically deformed in the radially inward direction when the abovementioned first and second annular engagement members 51, 61 are engaged to the first and second reference members 31, 41 and the bolts 4 are tightened up. In this case, it would be acceptable to build both the first and second annular engagement members 51, 61 and also the first and second reference members 31, 41 so that they can be elastically deformed; or, alternatively, it would be acceptable to build only the first and second reference members 31, 41 so that they can be elastically deformed.

[4] It is not necessary for the abovementioned reference seating surface 5 to be formed over the entire area of the upper surface of the base member 2; it could also be formed at a plurality of locations on the upper surface of the base member 2. In a similar manner, it is not necessary for the contact surface 6 which is contacted against the reference seating surface 5 to be formed over the entire area of the lower surface of the work pallet 3; it could also be formed at a plurality of locations on the lower surface of the work pallet 3.

[5] The head portions of the abovementioned bolts 4, 4A need not necessarily be received in the head portion reception holes 18*a*, 19*a*; it would also be acceptable for these head portion reception holes 18*a*, 19*a* to be omitted, so that the bolt head portions would project from the upper surface of the work pallet 3.

Figure 32:
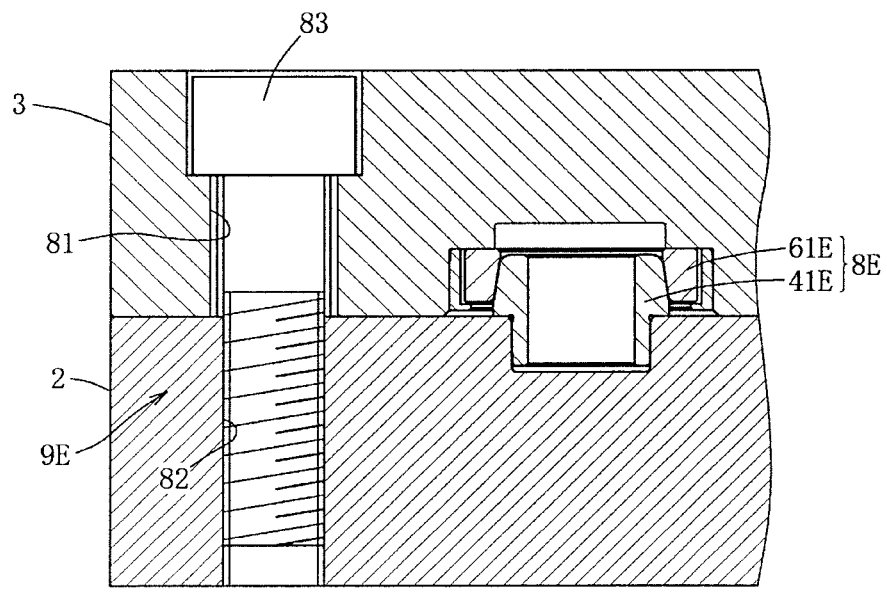
FIG. 32 is a partial sectional view of a pallet positioning/ fixing device according to another partially altered embodiment.
Figure 33:
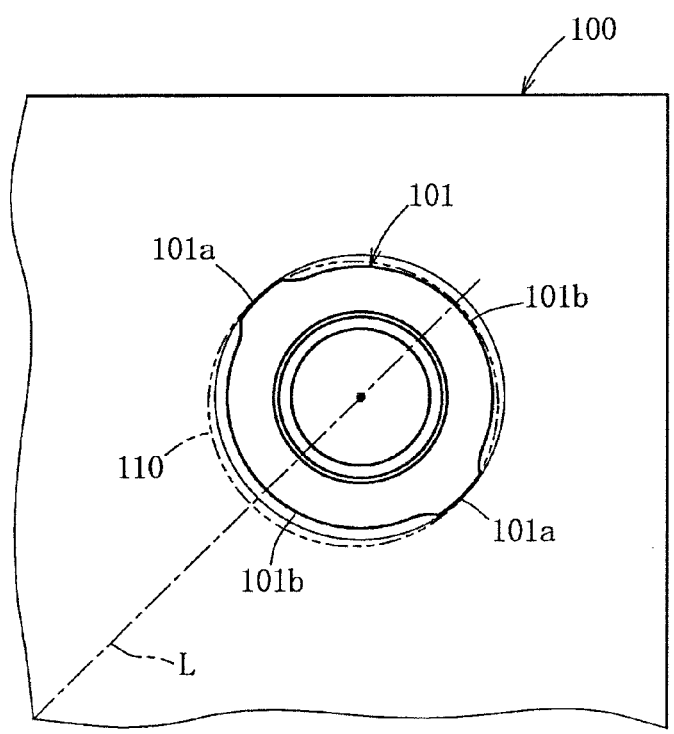
FIG. 33 is an enlarged view of principal portions of a second reference member of a pallet positioning/fixing device according to an example of the prior art.

[6] As shown in FIG. 32, along with a second positioning mechanism 8E being constituted by a second reference member 41E and a second annular engagement member 61E and bolt passage holes 81 being formed in the work pallet 3 at different positions from this second positioning mechanism 8E, bolt holes 82 may be formed in the base member 2 to correspond to the bolt passage holes 81, and the work pallet 3 may be fixed to the work pallet 3 by passing fixing bolts 83 through the bolt passage holes 81 and screwingly engaging them into the bolt holes 82. The bolt passage holes 18, the bolt holes 82, and the bolts 83 would then constitute a fixation mechanism 9E.

[7] The target object is not limited to being a work pallet 3; the present invention could be applied to any device that positions and fixes an article of various types, or to a member, a tool or the like. For example, it would also be possible to apply the present invention to a construction that positions and fixes a biasing claw member (i.e. a target object) that itself fixes a workpiece or the like on a base member 2. Moreover, the present invention could also be applied to a construction that positions and fixes a claw member (i.e. a target object) of a chuck device of a lathe.

[8] Apart from the above, for a person skilled in the art, it would be possible to implement additional embodiments in which various changes have been made to the above embodiment, without departing from the essence of the present invention, and the present invention is to be considered as including this type of variant embodiment.

In the technical field corresponding to work pallets, bias devices, chuck devices, and so on, the object positioning/fixing device according to the present invention can be applied to various mechanisms which position and fix a target object on a base member.

DESCRIPTION OF NUMERALS

L: line of centers
1, 1C: pallet positioning/fixing devices
2, 2C: base members
3, 3C: work pallets
5: reference seating surface
6: contact surface
7, 7C: first positioning mechanisms
8, 8A, 8B, 8C, 8E: second positioning mechanisms
9, 9E: fixation mechanisms
11: first fitting hole
12: second fitting hole
13: first bolt hole
15, 15C: first installation holes
16, 16A, 16B, 16C: second installation holes
16*a*, 16Aa: pairs of regulating surfaces
16*d*, 16Ad: annular reception surfaces
17: first bolt passage hole
18: second bolt passage hole
21, 21C: cylindrical holes
22, 22C: bush members
31, 31C: first reference members
31*a*: first tapered engagement surface
32: first convex engagement portion
33: first fitting barrel portion
34: first base end contact surface
41, 41C, 41E: second reference members
41*a*: second tapered engagement surface
42: second convex engagement portion
43: second fitting barrel portion
44: second base end contact surface
51, 51C, 51D: first annular engagement members
61, 61B, 61C, 61D, 61E: second annular engagement members
61*a*: tapered contact surface
61*b*: pair of regulated surfaces
61*d*: slit
61*e*: annular end surface
71: main installation hole portion
71*b*: annular reception surface
72: small diameter installation hole portion
72*a*: pair of tapered regulating surfaces
81: main annular portion
81*a*: tapered contact surface
81*b*: annular end surface
82: small diameter annular portion
82*b*: pair of tapered regulated surfaces

The invention claimed is:

1. An object positioning/fixing device, comprising a base member configured to receive a target object for positioning and fixing of the target object in a horizontal direction and in a vertical direction, wherein said base member comprises a reference seating surface for positioning said target object in the vertical direction, and said target object comprises a contact surface that can be contacted against said reference seating surface; there are provided a first positioning mechanism that can position said target object in the horizontal direction; a second positioning mechanism that is disposed at a position removed from the first positioning mechanism and that performs regulation so that the target object does not rotate within a horizontal plane around the first positioning mechanism as a center: and a fixation mechanism that can press and fix said target object to said base member; said first and second positioning mechanisms comprise, respectively, first and second reference members that are installed to the base member, and that comprise, respectively, first and second convex engagement portions on which first and second tapered engagement surfaces are formed, respectively, having diameters which become smaller towards respective ends thereof, first and second fitting barrel portions that are formed, respectively, integrally with said first and second convex engagement portions so as to extend toward said base member from respective ends of said first and second convex engagement portions and having diameters which are smaller, respectively, than those of said first and second convex engagement portions, and first and second base end contact surfaces that are formed, respectively, at respective base ends of said first and second convex engagement portions on respective sides of said first and second fitting barrel portions and are in contact with the reference seating surface of said base member; first and second fitting holes which are formed, respectively, in said base member and into which said first and second fitting barrel portions are fitted, respectively; and first, and second annular engagement members that are installed, respectively, in first and second installation holes formed in said target object, and with which said first and second convex engagement portions can be engaged, respectively; said second installation hole comprises a pair of regulating flat surfaces that are formed so that said second annular engagement member is shiftable only along direction of line of centers that connects axes of said first and second positioning mechanisms, and wherein said pair of regulating flat surfaces are parallel to the direction of said line of centers;

said second annular engagement member comprises a pair of regulated flat surfaces that can be closely contacted against said pair of regulating flat surfaces: and in the state in which the target object is pressed and fixed against said base member by said fixation mechanism: with only radial shifting via elastic deformation of at least respectively, one of said first and second convex engagement portions and said first and second annular engagement members, said first and second tapered engagement surfaces are closely contacted, respectively, against the inner circumferential surfaces of said first and second annular engagement members; said first and second base end contact surfaces are contacted, respectively, against said base member; the annular end surfaces of said first and second annular engagement members are contacted, respectively, against annular receiving surfaces of said first and second installation holes; and, via elastic deformation of said second annular engagement member with only radial shifting, said pair of regulated flat surfaces are closely contacted against said pair of regulating flat surfaces.

2. An object positioning/fixing device according to claim 1, wherein said second installation hole is directly formed in said target object.

3. An object positioning/fixing device according to claim 1, wherein a slit is formed in said second annular engagement member for promoting elastic deformation thereof in the radial direction.

4. An object positioning/fixing device according to claim 1, wherein said second installation hole is formed in a bush member that is installed into and fitted in a cylindrical hole formed in said target object.

5. An object positioning/fixing device according to claim 1, wherein: said second annular engagement member comprises a main annular portion to which said second convex engagement portion engages, and a small diameter annular portion that is formed integrally therewith so as to extend from an end portion opposite to one end of the main annular portion away from that one end, and whose diameter is smaller than that of said main annular portion; said second installation hole comprises a main installation hole portion in which said main annular portion is contained so as to be shiftable in the horizontal direction, and a small diameter installation hole portion that communicates with the main installation hole portion and in which said small diameter annular portion is contained so as to be shiftable in the direction of said line of centers; said pair of regulating surfaces are formed to be a pair of tapered regulating surfaces that are formed on an internal circumferential portion of said small diameter installation hole portion and that slope so as to approach one another away from said second convex engagement portion; and said pair of regulated surfaces are formed on said small diameter annular portion so as to be capable of closely contacting said pair of tapered regulating surfaces.

6. An object positioning/fixing device according to claim 1, wherein said fixation mechanism comprises first bolt passage holes formed in each of said first and second reference members, second bolt passage holes formed in the target object so as to correspond to each of these first bolt passage holes, and first bolt holes formed in said base member so as to correspond to each of said first and second bolt passage holes.

* * * * *